(12) United States Patent
Yoon et al.

(10) Patent No.: US 7,601,211 B2
(45) Date of Patent: Oct. 13, 2009

(54) PROCESS FOR PREPARING POROUS HYBRID COMPRISING ZEOLITE AND CHITOSAN AND POROUS HYBRID PREPARED THEREBY

(75) Inventors: Kyung Byung Yoon, Seoul (KR); Eun Ah Lee, Seoul (KR); Eun Jeon, Seoul (KR); Yun Jo Lee, Seoul (KR)

(73) Assignee: Industry-University Cooperation Foundation Sogang University, Seoul (KR)

( * ) Notice: Subject to any disclaimer, the term of this patent is extended or adjusted under 35 U.S.C. 154(b) by 847 days.

(21) Appl. No.: 10/560,964

(22) PCT Filed: Jun. 18, 2004

(86) PCT No.: PCT/KR2004/001467

§ 371 (c)(1),
(2), (4) Date: Dec. 16, 2005

(87) PCT Pub. No.: WO2004/110619

PCT Pub. Date: Dec. 23, 2004

(65) Prior Publication Data

US 2006/0135360 A1    Jun. 22, 2006

(30) Foreign Application Priority Data

Jun. 19, 2003  (KR) .................. 10-2003-0039691

(51) Int. Cl.
*C08L 5/08*    (2006.01)
*C09D 105/08*  (2006.01)

(52) U.S. Cl. ...................... 106/162.2; 502/62
(58) Field of Classification Search ............ 106/162.2; 502/62, 401, 404
See application file for complete search history.

(56) References Cited

U.S. PATENT DOCUMENTS

| 4,775,650 | A  | * | 10/1988 | Portier ..................... 502/62 |
| 2003/0022574 | A1 |   | 1/2003  | Pesce et al. ................. 442/96 |
| 2006/0135360 | A1 | * | 6/2006  | Yoon et al. ................. 502/404 |

FOREIGN PATENT DOCUMENTS

WO    WO 0196106    12/2001

OTHER PUBLICATIONS

U.S. Appl. No. 10/566,603, filed Jan. 13, 2004, Lee et al.

* cited by examiner

*Primary Examiner*—David M Brunsman
(74) *Attorney, Agent, or Firm*—The Nath Law Group

(57) ABSTRACT

The present invention relates to a process for preparing a porous hybrid comprising zeolite and chitosan and a porous hybrid prepared thereby, in particular, to a process for preparing a porous chitosan-linking compound-zeolite hybrid, which comprises the steps of: (a) forming a linking compound-zeolite intermediate by linking a linking compound to the surface of zeolite; and (b) preparing said chitosan-linking compound-zeolite hybrid by reacting said linking compound-zeolite intermediate with chitosan or a linking compound-chitosan, a porous hybrid prepared thereby, an adsorbent and a method for purifying water.

23 Claims, 19 Drawing Sheets

Adsorption Amount to Methylene Blue

Adsorption Amount to Methyl Orange

Adsorption Amount to Lead Ion

PROCESS FOR PREPARING POROUS HYBRID COMPRISING ZEOLITE AND CHITOSAN AND POROUS HYBRID PREPARED THEREBY

BACKGROUND OF THE INVENTION

1. Field of the Invention

The present invention relates to a process for preparing a porous hybrid comprising zeolite and chitosan and a porous hybrid prepared thereby, in particular, to a process for preparing a porous hybrid capable of simultaneously removing both cation and anion, a porous hybrid prepared thereby, an adsorbent and a method for purifying water.

2. Description of the Related Art

Zeolite is a generic name of crystalline aluminosilicate, which constitutes the pore skeleton of zeolite molecules and bears an anionic charge for each aluminum atom. Cations for offsetting such anion charges are present within the pore space and the remaining pore space is filled with water. The three-dimensional pore structure of the zeolite molecule varies depending on the shape and size of the pore, and the pore diameter is usually determined by size of the molecule. Therefore, based on the shape and size of the pore, zeolite has the size and shape selectivity for molecules entering into the pore. In this connection, zeolite is called a molecular sieve.

Meanwhile, there are many known zeotype molecular sieves wherein a part or all of silicon (Si) and/or aluminum (Al) atoms constituting the structural skeleton of zeolite molecule are replaced with other elements. For example, a mesoporous silica (MCM-series mesoporous silica and silicate) in which aluminum atoms are completely eliminated, an alpo ($AlPO_4$)-typed molecular sieve in which silicon atoms are replaced with phosphorous atoms, and other molecular sieve or zeotype material wherein skeleton metal atoms are partially replaced with various metal atom such as Ti, Mn, Co, Fe and Zn have been developed and widely used. The materials described above are derived from zeolites and thus generally called as zeolites in the art, while they not belong to zeolites in terms of mineralogy. Accordingly, the term "zeolite" used herein refers to zeolite in a broad sense including zeotype molecular sieves described previously.

Zeolites are widely used in the field of households and various industries serving as a catalyst for cracking petroleum, adsorbent, water-absorbing agent, gas-purifying agent, additives for detergent and soil improving agent. In particular, zeolites are very useful as an ion exchanger to eliminate heavy metals, radioisotopes and diverse ionic dyes in industrial wastewater.

Such molecular sieves such as zeolite or zeotype materials are prepared by crystallizing the precursor thereof and generally obtained in the form of fine powder. However, the find powder form gives rise to some serious shortcomings in application of zeolites.

For example, when such zeolite or zeotype materials in the form of powder are charged into a fixed bed, it is difficult for a liquid or gaseous fluid to flow through the powder since the pressure drop phenomena severely occurs. Therefore, a very high pressure is required to maintain a sufficient flow velocity in the fixed bed charged with molecular sieve powder, which causes some problems such as much energy consumption. Accordingly, there have been proposed various countermeasures in order to avoid such problems owing to the pressure drop phenomena.

The most commonly known method is to prepare a zeolite-clay composite in which zeolite powder is conglomerated using clay as a binder to form a paste, which is then granulated to pellets or beads with the size of 2-5 mm. However, the above-described method the inorganic binder interferes the access of ions to be removed into the inner portion of the pellets or beads, so that the efficiency of zeolite in ion exchange becomes lower. In addition, pellets or beads come untied when exposed to water for a long period of time to form fine powders that are difficult to remove.

Chitosan is the most abundant biopolymer second only to cellulose (1). It is generally prepared by deacetylating chitin found in a crustacean such as crab and lobster, insects such as grasshopper and dragonfly, mushrooms such as enoki mushroom and black mushroom, and bacteria. Chitin is annually produced in the amount of about a hundred billion tons.

Chitosan is a polysaccharide consisting of N-acetyl-D-glucosamine residues in $\beta$-1,4 linkage, which is lack of acetyl groups in amine groups found in chitin contributing to the existence of polycation in acidic solution. Therefore, chitosan shows considerable water-solubility in aqueous acid solution and therefore exhibits excellent workability and physical strength after drying. In this connection, chitosan is usually prepared in the form of powder, fiber, film, gel or bead (2). Depending on the number of monomer, chitosan is classified to oligomeric chitosan having around 12 monomers and polymeric chitosan. The polymeric chitosan is in turn classified to a low-molecular weight chitosan with MW of below 150,000, a high-molecular weight chitosan with MW of from 700,000-1,000,000 and a middle-molecular weight chitosan with intermediate MW range.

Chitosan has been reported to excellent adsorption capacity to anionic pigments and heavy metals (3-6), in which amine groups in glucosamine residues form complex ions through coordinate bonds to capture heavy metals in wastewater. More advantageously, chiotosan exhibits remarkable adsorption capacity to low concentration of transition metal ions in Period 3. However, chitosan is susceptible to solubilization in water, in particular, acidic medium (15), which renders the removal of chitosan difficult in processes using aqueous medium.

To be free from the shortcomings described previously, chitosan beads prepared using basic solution are treated with glutaraldehyde for crosslinking chitosan polymers so as to prevent solubilization in water and the resultants serve as filler in fixed bed typed filter (16). However, the crosslinkages formed between chitosan polymer stands significantly decrease availability of the inner portion of chitosan beads to access of ions as inorganic binder, so that the inner portion of chitosan beads treated with glutaraldehyde is not available in adsorption.

In the meantime, there have not been yet reported ion exchangers capable of removing both harmful cations such as heavy metal ions and harmful anions in wastewater. In this regard, it is general in the art that two types of ion exchanger capable of removing each of anion and cation are mixed merely through physical methods in order to simultaneously remove harmful cations and anions in wastewater. However, even if zeolite and chitosan follow such approach, they cannot be free from the drawbacks described hereinabove.

Throughout this application, various patents and publications are referenced and citations are provided in parentheses. The disclosure of these patents and publications in their entities are hereby incorporated by references into this application in order to more fully describe this invention and the state of the art to which this invention pertains.

DETAILED DESCRIPTION OF THIS INVENTION

Endeavoring to be free from the shortcomings of conventional technologies described above, the present inventors have accomplished to covalently link zeolite to chitosan, and found that the hybrid of zeolite and chitosan has macropores and exhibits excellent adsorption capacity.

Accordingly, it is an object of this invention to provide a process for preparing a porous chitosan-linking compound-zeolite hybrid.

It is another object of this invention to provide a porous chitosan-linking compound-zeolite hybrid.

It is still another object of this invention to provide an adsorbent capable of removing both cationic substances.

It is still yet another object of this invention to provide a method for purifying water.

Other objects and advantages of the present invention will become apparent from the detailed description to follow taken in conjugation with the appended claims and drawings.

The present invention is directed to a porous chitosan-linking compound-zeolite hybrid prepared in such a manner that a linking compound is linked to the surface of zeolite and the resultant is linked to chitosan or linking compound-chitosan at various ratios or linked to chitosan or linking compound-chitosan with various pre-processed forms, and a process for preparing the hybrid.

In one aspect of this invention, there is provided a process for preparing a porous chitosan-linking compound-zeolite hybrid, which comprises the steps of: (a) forming a linking compound-zeolite intermediate by linking a linking compound to the surface of zeolite; and (b) preparing said chitosan-linking compound-zeolite hybrid by reacting said linking compound-zeolite intermediate with chitosan or a linking compound-chitosan.

The suitable chitosan in this invention may be any one available to one skilled in the art and its non-limiting example includes:

(i) natural or synthetic chitosan obtained from any raw material;

(ii) chitosan having molecular weight of more than 10,000 and deacetylation degree of more than 10%;

(iii) chitosan having natural-occurring form or processed form by chemical or physical methods (e.g., powder, flake, fiber, sponge, film or aqueous solution with a concentration of more than 0.5%);

(iv) chitosan with entirely or partially substituted functional groups; and (v) crosslinked chitosan by use of organic molecules.

As described previously, the term "zeolte" used herein refers to a broad-sense zeolite including zeotype materials. Non-limiting examples of zeolite suitable in this invention are as follows:

(i) natural and synthetic zeolite;

(ii) modified zeotype materials wherein all or a part of the silicon atoms in the zeolite skeleton are replaced with other atoms such as phosphorous (P) (e.g., AlPO4, SAPO, MeAPO, MeAPSO typed molecular sieve);

(iii) modified molecular sieve in which all or a part of the aluminum atoms in the zeolite skeleton are replaced with other atoms such as boron (B), gallium (Ga) and titanium (Ti);

(iv) molecular sieves prepared by the combination of the above modifications of items ii) and iii);

(v) porous metals or silicon oxides (e.g., silicalite, MCM typed porous silica, porous titanium dioxide and niobium dioxide) or composite oxide thereof; and (vi) porous molecular sieves prepared using any other elements alone or in a combination.

The term "linking compound" used herein refers to materials to mediate the linkages between zeolite and chitosan, having at least two functional groups in which one functional group forms a chemical linkage to zeolite and the other functional group forms a chemical linkage to a functional group on the surface of modified or unmodified chitosan.

The functional group capable of forming chemical linkages to zeolite and chitosan means (a) with respect to zeolte with hydroxyl groups a group capable of chemically binding to hydroxyl groups of zeolite, for example, including halosilyl group [—SiX$_{3-n}$A$_n$ (n=0-2) X=halogen atom, A=alkyl, hydrogen, alkoxy or aryl groups], alkoxysilyl (e.g., —Si(OCH$_3$)$_3$) and isocyanato group (—N=C=O) and (b) with respect to chitosan aldehyde group. It has been reported that chitosan is crosslinked by compounds carrying the function group described above to transform aqueous chitosan solution to a gel form.

It would be appreciated that a suitable functional group for chemical linkage may be selected depending on the nature (functionality) of surface of materials.

Preferably, the linking compound suitable in this invention includes the compounds represented by the following formulae 1-5:

   R$_3$Si—L—X                                                      Formula 1

   R$_3$Si—L—Y                                                      Formula 2

   Y—L—Y                                                           Formula 3

   Y—Y                                                             Formula 4

   R$_3$Si—L                                                        Formula 5 wherein, R represents a halogen atom, C$_1$-C$_4$ alkoxy or alkyl group in which at least one of three R groups is a halogen atom or alkoxy group; L represents substituted or unsubstituted C$_1$-C$_{17}$ alkyl, aralkyl or aryl group which may have at least one oxygen, nitrogen and sulfur atom; X represents a leaving group selected from the group consisting of halogen, isocyanate, tosyl and azide, most preferably, halogen; Y represents a reactive functional group of coordinate compounds capable of exchanging ligands selected from the group consisting of hydroxyl, thiol, amine, ammonium, sulfone and its salt, carboxyl acid and its salt, acid anhydride, epoxy, aldehyde, ester, acrylate, isocyanate (—NCO), sugar residue, double bond, triple bond, diene, diyne and alkylphosphine in which said reactive functional group may be present in the middle or at the terminal ends of said linking compound.

The linking compound combined to zeolite may have at least one functional group in the skeleton of the linking compound to give the secondary chemical linkage. For instance, where a linking compound combined to zeolite contains formyl groups (—CHO), zeolite can chemically bind to chitosan since a chemical reaction between the amino groups of chitosan and the formyl groups may easily occur.

In addition, the functional groups of chitosan may be modified depending on the type of linking compound for zeolite in consideration of reaction rate and conditions. For example, a bifunctional compound in which one functional group is reactive with linking compound-zeolite intermediate and the other functional group is aldehyde group, may be used to modify functionality of chitosan.

In summary, the linking compound must have at least two functional groups, one of which is designed for chemically combining to zeolite and the other of which is designed for chemically combining to functional group on the surface of modified or unmodified chitosan. The matching or combination of the linking compound and its functional group may greatly vary and is easily achieved by one ordinarily skilled in the art. Those variations and modifications are also included in the scope of the present invention if they employ the concept of the present invention.

Chemical reactions between zeolite and linking compound are summarized as follows: Since zeolite has hydroxyl groups on its surface as described above, it can react with linking compound having a suitable functional group capable of reacting with hydroxyl group to form linking compound-zeolite intermediate. Further, since a certain functional group can be modified or changed to a new functional group by a suitable treatment, the surface of zeolite can be modified through a chemical treatment so as to have new functionality. The natures and conditions of such reactions have been publicly known in the art (17-29).

According to a specific example of this invention, the process for forming a linking compound-zeolite intermediate is set forth as follows: Zeolite particles are put into a container containing an organic solvent such as toluene, to which a linking compound is added and the mixture is heated. Instead of toluene, another organic solvent such as hexane, benzene, tetrachlorocarbon and alcohols can be adequately used for the reaction. When forming such a chemical bonding onto the surface of zeolite, the vapor of the organic compound can be sometimes used to directly generate the chemical bonding. Upon the completion of reaction, zeolite crystals are washed with toluene and dispersed using a ultrasonicator. The molecular sieves in the dispersed liquid is filtered through a filter paper and then washed well with organic solvent. When the zeolite particles are too small to use filter paper, a centrifugation is employed to separate the particles. The separated zeolite crystals are washed by repeating the process consisting of dispersing in organic solvent and separating. The linking compounds may also be evaporated without solvent under vacuum so as to combine with zeolite.

In the present invention, a specific example for modifying functional groups of chitosan is described hereunder:

Amine groups present in each monomer constituting chitosan are readily reacted with aldehyde group. Therefore, for modifying functional groups of chitosan, a bifunctional compound in which its one functional group is reacted with linking compound-zeolite and another functional group is aldehyde group, is mixed with aqueous chitosan solution at equivalent concentration substantially identical to equivalent of chitosan monomers.

The process for preparing chitosan-linking compound-zeolite hybrid through forming covalent bonds between linking compound-zeolite intermediate and chitosan is illustrated as follows:

The linking compound-zeolite with having functional groups for chemical bonding is added to water and well dispersed using a ultrasonicator. The dispersed linking compound-zeolite solution is mixed with aqueous chitosan solution to generate chemical linkages between the linking compound and functional group of chitosan. The matching or combination of the linking compound and its functional group may greatly vary and is easily achieved by one ordinarily skilled in the art. Upon the completion of reaction, the mixed zeolite-chitosan solution is transformed to a gel form and freeze-dried to form a final chitosan-linking compound-zeolite hybrid. Alternatively, prior to the reaction with zeolite, chitosan is previously processed to have a form, e.g., sponge, film, fiber, flake and powder, and added to a reaction container containing an organic solvent such as toluene. To the reaction container, is added the dispersed linking compound-zeolite solution and then heating or ultrasonication is executed for forming chemical linkages between linking compounds bound to zeolite and amine groups of chiosan. After the generation of hybrids, the solvent is evaporated under vacuum to dry hybrids.

According to a preferred embodiment, the present process further comprises the step (c) of preparing a sponge form of said chitosan-linking compound-zeolite hybrid by drying said chitosan-linking compound-zeolite hybrid after the step (b). The reason why the hybrid is transformed to a sponge form is that the porous hybrid generated upon the removal of water by drying exhibits excellent ion-exchange capacity. More preferably, the drying is carried out by freeze-drying.

In the case of applying the hybrid of this invention to an absorbent, it is preferred that the present process further comprises the step (d) of intruding water into said sponge form after the step (c) because the introduction of water into zeolite enables the amount of bubble confined in the hybrid to be minimized so that the ion-exchange efficiency of hybrids becomes maximized.

According to a preferred embodiment, the process of this invention further comprises the step of preparing a double-crosslinked chitosan-linking compound-zeolite hybrid by reacting a bifunctional compound with said chitosan-linking compound-zeolite hybrid after the step (b). Such the double-crosslinking permits to provide a concrete hybrid that is not swelled upon immersion in water at undesirable level. In addition, the double-crosslinking allows having relatively more crosslinks when the weight ratio of zeolite to chitosan is small or the hybrid with low overall density is prepared.

The chitosan-linking compound-zeolite hybrid prepared by the present process generally has macropores with a size ranging about from 10 to 500 μm. The size of pores may be adjusted by varying a concentration ratio of said zeolite to said chitosan or chitosan-linking compound. In addition, in the case of using aqueous chitosan chitosan-linking compound solution, the size of pores may be adjusted by varying a weight ratio of (i) water to (ii) said chitosan or chitosan-linking compound.

In another aspect of this invention, there is provided a process for preparing a porous chitosan-linking compound-zeolite hybrid, which comprises the steps of: (a) forming a linking compound-zeolite intermediate by linking a linking compound to the surface of zeolite, in which the surface of said linking compound-zeolite intermediate displays functional groups unreactive with functional groups of chitosan or a linking compound-chitosan; and (b) preparing said chitosan-linking compound-zeolite hybrid by homogeneously mixing said linking compound-zeolite intermediate with chitosan or said linking compound-chitosan and reacting the resulting mixture with a bifunctional compound to be reactive with said linking compound-zeolite intermediate and chitoan or said linking compound-chitosan.

In still another aspect of this invention, there is provided a process for preparing a porous chitosan-linking compound-zeolite hybrid, which comprises the steps of: (a) forming a linking compound-zeolite intermediate by linking a linking compound to the surface of zeolite; (b) mixing said linking compound-zeolite intermediate with chitosan or said linking compound-chitosan; (c) transforming the mixture of step (b) to a sponge form; and (d) preparing said chitosan-linking compound-zeolite hybrid by forming covalent bonds between function groups of said linking compound-zeolite intermediate and function groups of said chitosan or said linking compound-chitosan contained in said sponge form.

In further aspect of this invention, there is provided a process for preparing a porous chitosan-linking compound-zeolite hybrid, which comprises the steps of: (a) transforming a chitosan solution or a linking compound-chitosan solution to a sponge form; (b) forming a linking compound-zeolite intermediate by linking a linking compound to the surface of zeolite; and (c) preparing said chitosan-linking compound-zeolite hybrid by forming covalent bonds between function groups of said linking compound-zeolite intermediate and function groups on the surface of said chitosan sponge or said linking compound-chitosan sponge.

The above-described aspects of this invention are a modification of the first aspect of this invention described previously and therefore, the common descriptions between them are omitted in order to avoid undue redundancy leading to the complexity of this specification.

According to a preferred embodiment, the transformation to a sponge form is carried out by drying.

The formation of covalent bonds between functional groups is carried out by heating treatment or ultrasonication, preferably, heating treatment.

According to a preferred embodiment, the process of this invention further comprises the step of intruding water into said sponge form after the final step.

Where the weight ratio of zeolite to chitosan is small or the hybrid with low overall density is prepared, the process of this invention further comprises the step of preparing a double-crosslinked chitosan-linking compound-zeolite hybrid by reacting a bifunctional compound with said chitosan-linking compound-zeolite hybrid after the final step, in order to generate more concrete hybrid by introducing much more crosslinks.

It is preferable that the drying is carried out by freeze-drying.

The hybrid prepared by the present process is very likely to have macropores. The size of pores may be adjusted by varying a concentration ratio of said zeolite to said chitosan or chitosan-linking compound. In addition, in the case of using aqueous chitosan chitosan-linking compound solution, the size of pores may be adjusted by varying a weight ratio of (i) water to (ii) said chitosan or chitosan-linking compound.

The term "porous" used herein refers to a structural feature characterized in that the flow and access of water or air are permitted to freely occur through both pores inherently present in materials constituting the hybrid and pores present in the skeleton of the hybrid.

In the present invention, the chemical linkage between zeolite and chitosan is prepared in accordance with the previous suggestion of the present inventors patented in Korea (see Korea Pat. No. 335966), the teachings of which are incorporated herein by reference.

In still further aspect of this invention, there is provided a porous chitosan-linking compound-zeolite hybrid, characterized in that it is prepared in accordance with the process of this invention afore-described.

The present chitosan-linking compound-zeolite hybrid has macropores with a size ranging about from 10 to 500 μm. Where the hybrid has the weight ratio of zeolite to chitosan of 1 (density, 23 mg/cm$^3$), 5 (density, 78.5 mg/cm$^3$) and 10 (density, 102.5 mg/cm$^3$), the compressive strength of the hybrid at 10% deformation is 13.9, 46.7 and 87.9 kPa, respectively, which is excellent mechanical strength. The macroporous property permits ions in liquid or gas sample to freely diffuse, increasing their contact frequency to acid sites and active sites of chitosan and zeolite in the present hybrid. The term "macropore" used herein means a pore in a size ranging from 50 to 500 μm.

Furthermore, the excellent mechanical strength of the present chitosan-linking compound-zeolite hybrid enables the hybrid not to be dissolved in water and but to maintain its structure, making it feasible to collect the hybrids in water environment after use. Such features permit the hybrid of this invention to be applied to fixed-bed filter.

The above-described chitosan-linking compound-zeolite hybrid is employed in a wide variety of applications of chitosan and zeolite. For example, the applications include (i) purification of water by adsorbing metal ions, dyes and components in polluted water or wastewater, or purification of tap water, underground water and air; (ii) soil conditioner and interior/exterior materials of buildings for antibiotic and humidity-adjusting effect; (iii) antibiotic and humidity-adjusting materials of clothes and households; and (iv) package or filler for antibiotic property and freshness extension of vegetables.

In another aspect of this invention, there is provided an adsorbent characterized in that it comprises the porous chitosan-linking compound-zeolite hybrid of this invention and is capable of removing both cationic substances including heavy metals and anionic substances present in polluted water or wastewater.

There have not been prior arts to suggest the simultaneous removal of two typed ions (cation and anion) by using covalent-linked zeolite and chitosan as the present invention. The present absorbent is not dissolved in water and is collected after use, permitting to serve as filler in a fixed-bed filter. Therefore, the absorbent of this invention takes a great giant step in the water treatment process.

The cationic dye adsorption capacity of the present adsorbent is approximately 2-2.5 mg/g of hybrid, the anionic dye adsorption capacity is approximately 25-30 mg/g of hybrid and the maximum adsorption capacity to amphoteric heavy metals is around 200 mg/g of hybrid.

In still another aspect of this invention, there is provided a method for purifying water comprising contacting polluted water or wastewater to the porous chitosan-linking compound-zeolite hybrid of this invention.

According to the present purification method, both cation and anion present in polluted water or wastewater are removed in higher exchange efficiency. The present method is applied to divers process, for example, fluidized-bed or fixed-bed process.

The following specific examples are intended to be illustrative of the invention and should not be construed as limiting the scope of the invention as defined by appended claims.

BRIEF DESCRIPTION OF THE DRAWINGS

FIG. 2a, 30×; FIG. 2b, 100×; and FIG. 2c, 500×.

FIG. 3a, 100×; FIG. 3b, 500×; and FIG. 3c, 2,500×.

EXAMPLES

Example 1

Preparation of Chitosan Solution

Figure 1:
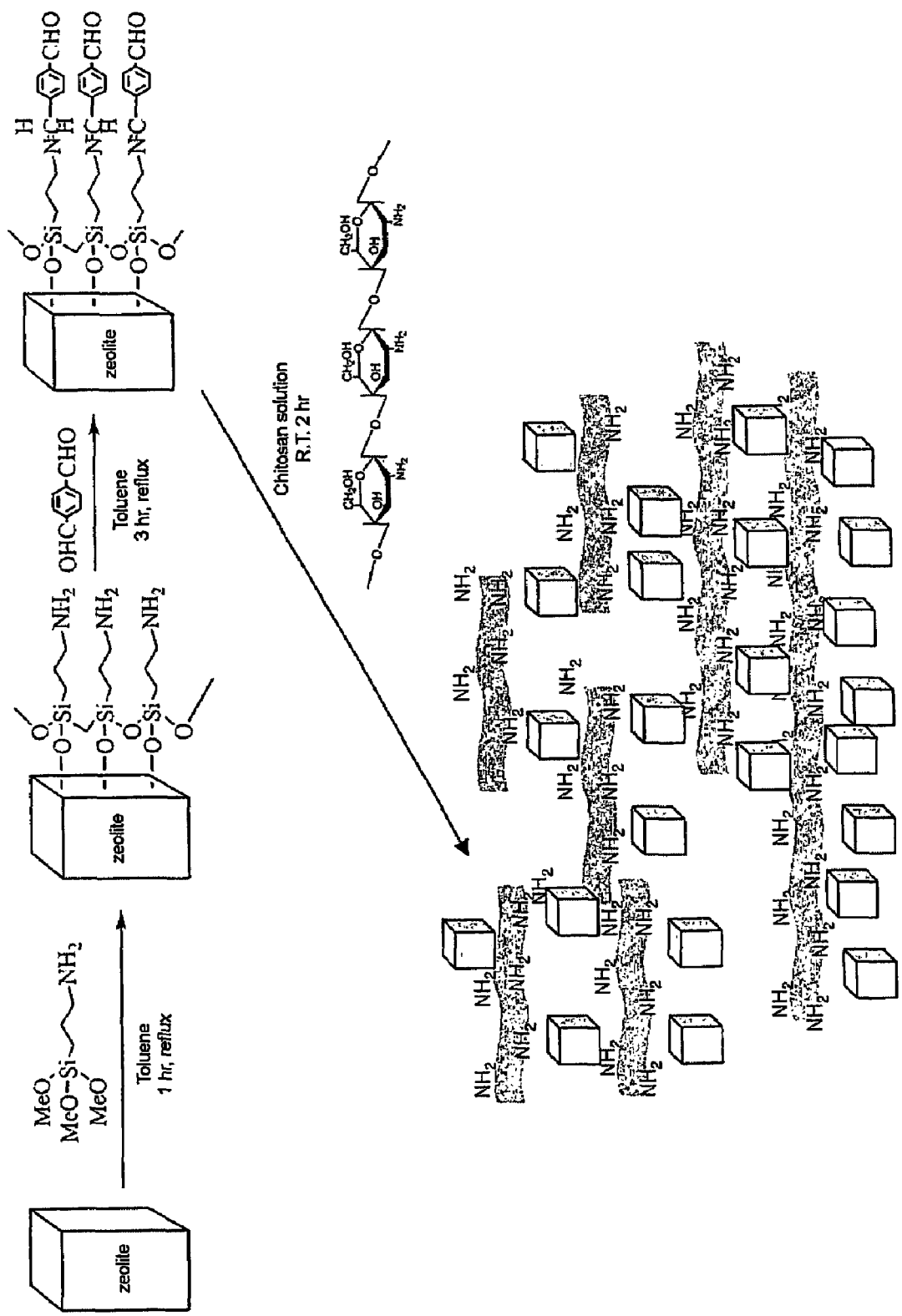
FIG. 1 schematically represents a specific example of the present process to prepare the hybrid.

Chitosan flake or powder (TaxanMed Tech, Inc.) was immersed in distilled water for 1 hr and then 1% chitoan solution was prepared by adding DW, acetic acid or hydrochloric acid, followed by vigorous stirring for complete dissolution. The chitosan solution was filtered through glass filter for removing contaminants.

Example 2

Preparation of Solution Containing Chitosan with Modified Functional Groups

Depending on the concentration of chitosan solution, a suitable amount of acrolein (Aldrich Chemical Co., Inc.) or glyoxylic acid (Aldrich Chemical Co., Inc.) was added to chitosan solution and homogeneously mixed. The aldehyde groups of acrolein or glyoxylic acid were readily reacted with amine groups of chitosan to give a solution containing modified chitosan in which vinyl or carboxyl groups were linked to amine groups of chitosan glucosamine residues.

Example 3

Preparation of Zeolite Tethered with One Type of Linking Compound 10 g of zeolite were calcined for 12 hr at 550° C. to remove organic components and dispersed in toluene solution (100 ml) containing 1 ml of aminopropyl trimethoxysilane (Aldrich Chemical Co., Inc.), followed by heating for 1 hr at 110° C. The aminopropyl group-bound zeolite crystals were then washed several times by repeating the processes of dispersing in 100 ml of toluene, centrifuging and discarding supernatant. The washed zeolite crystals were washed again with ethanol and the solvent was evaporated under vacuum, yielding 10 g of zeolite tethered with linking compound.

Example 4

Preparation of Zeolite Tethered with Two Types of Linking Compound 10 g of zeolite (Union Carbide) were calcined for 12 hr at 550° C. to remove organic components and dispersed in toluene solution (100 ml) containing 1 ml of aminopropyl trimethoxysilane[$H_2N-(CH_2)_3-Si-(OCH_3)_3$] (Aldrich Chemical Co., Inc.), followed by heating for 1 hr at 110° C. The aminopropyl group-bound zeolite crystals were washed by repeating the process of dispersing in 100 ml of toluene and centrifuging. The washed zeolite crystals were added to toluene or other suitable organic solvent and homogeneously dispersed by use of ultrasonicator. 30 ml of the zeolite dispersion were added dropwise to 70 ml of the vigorously stirring tetraphthaldicarboxaldehyde solution ($CHO-(C_6H_{12})-CHO$)(Aldrich Chemical Co., Inc.), resulting in the homogeneous linkage of the linking compound onto the surface of zeolite crystals without coagulation between zeolite crystals.

100 ml of the mixture were refluxed for 2 hr at 110° C. After completion of the reaction, the resulted zeolite crystals were washed several times by repeating the process of dispersing in toluene and centrifuging and subsequently washed with ethanol. The resulted powders were dried by vacuum evaporation to yield 10 g of zeolite crystals tethered with linking compounds.

Example 5

Preparation of Porous Hybrid by Binding Chitosan to Linking Compound-Zeolite Intermediate The linking compound-zeolite tethered with two types of linking compound, having aldehyde group at its terminal portion, was prepared in accordance with the processes as Example 4.

The linking compound-zeolite intermediates were dispersed in distilled water to a concentration of 20 mg/ml and homogeneously dispersed using ultrasonicator. The resultant was mixed with 1 ml of 2% chitosan solution at a suitable concentration ratio. The mixture was left stand over 30 min at room temperature for forming the linkages between aldehyde groups bound to zeolite surface and amine groups of chitosan and was frozen, followed by drying by freeze-dryer, thereby giving 40 mg of porous chitosan-linking compound-zeolite hybrid.

The processes described in the Example are schematically represented in FIG. 1.

Figure 2A:
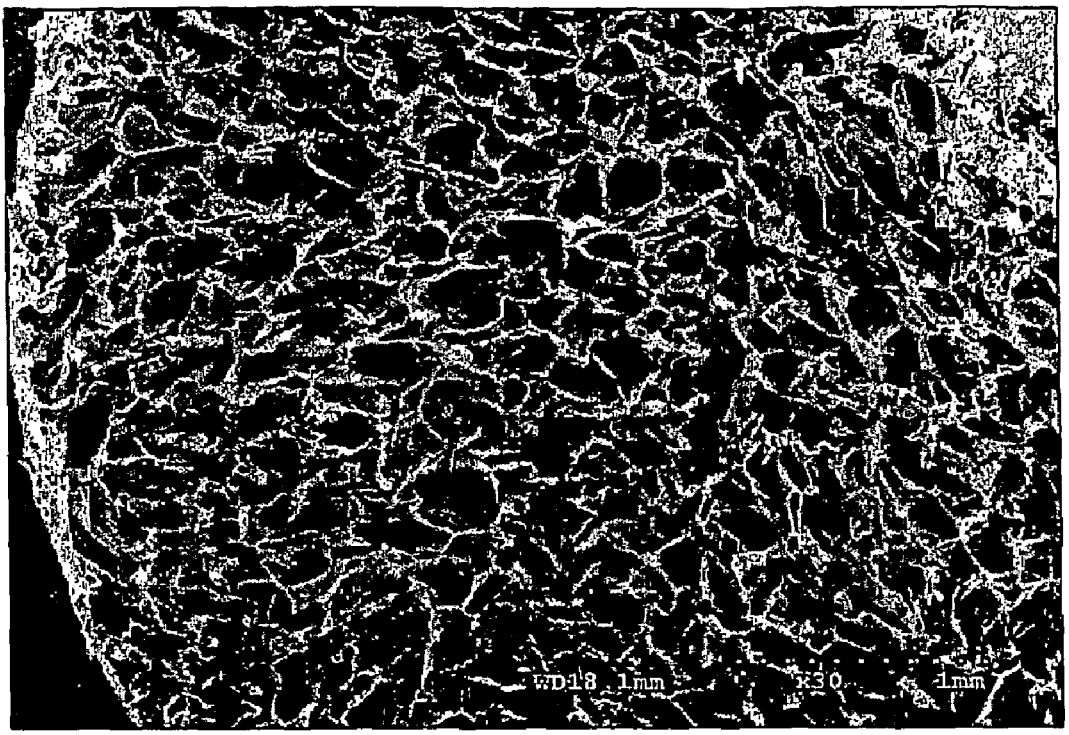
FIGS. 2a-2c show SEM images of the hybrid prepared using the concentration ratio of chitosan to zeolite-Y of 1:1 in Example 5.
Figure 2B:
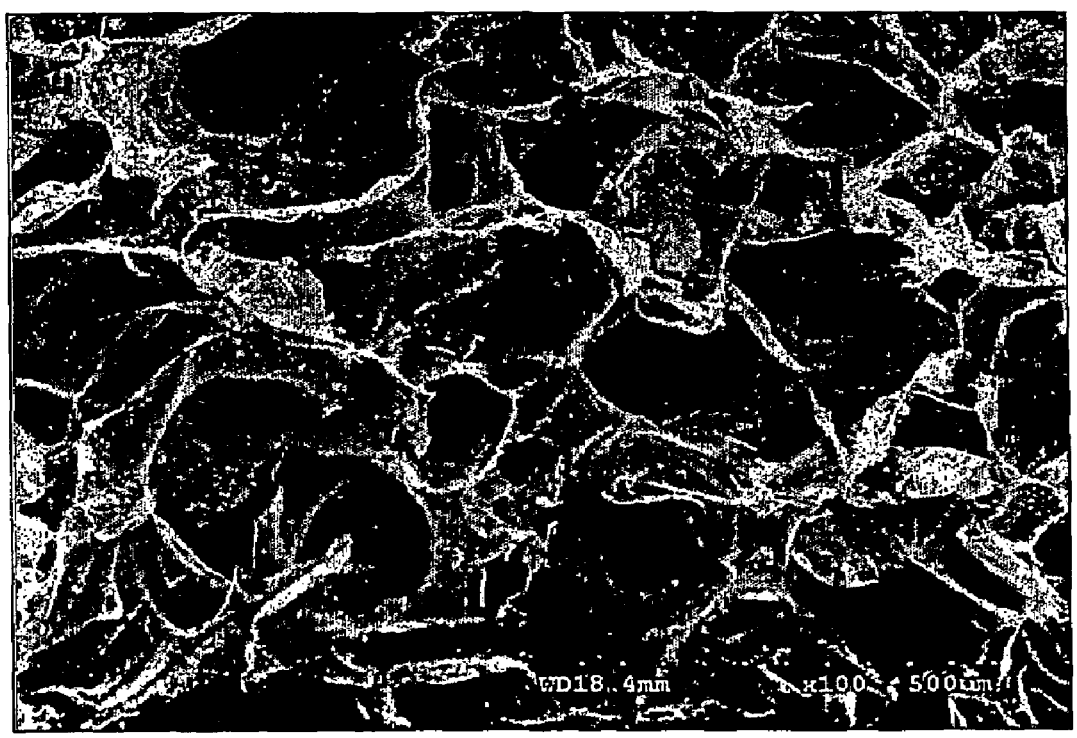
Figure 2C:
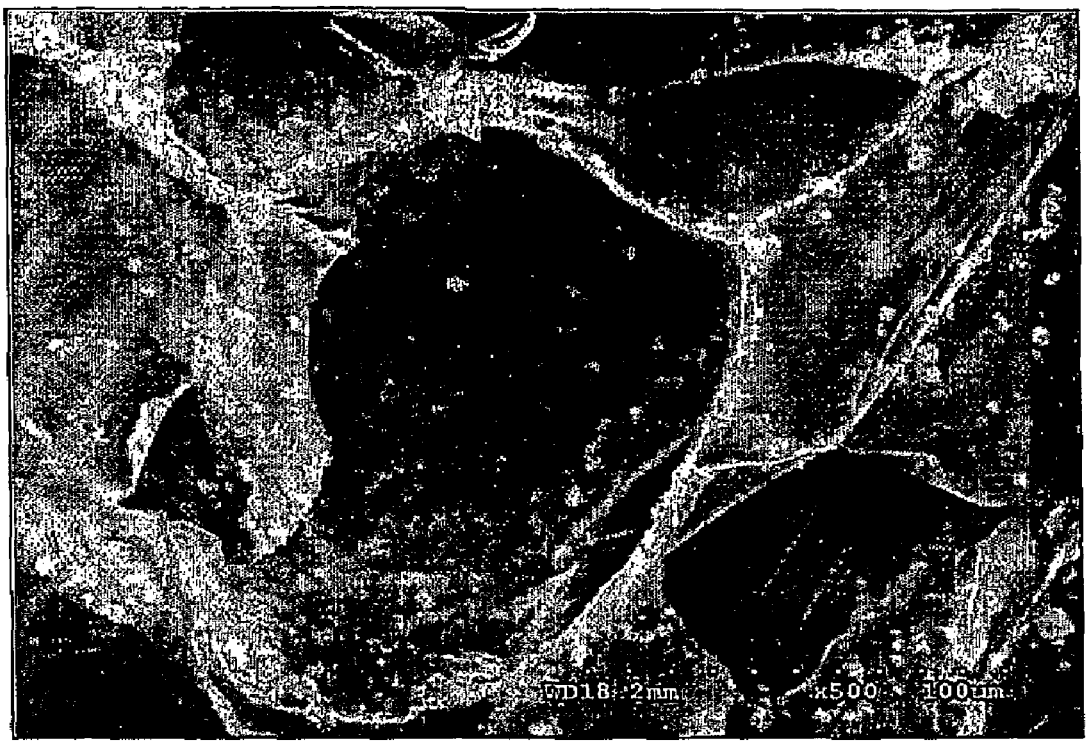
Figure 3A:
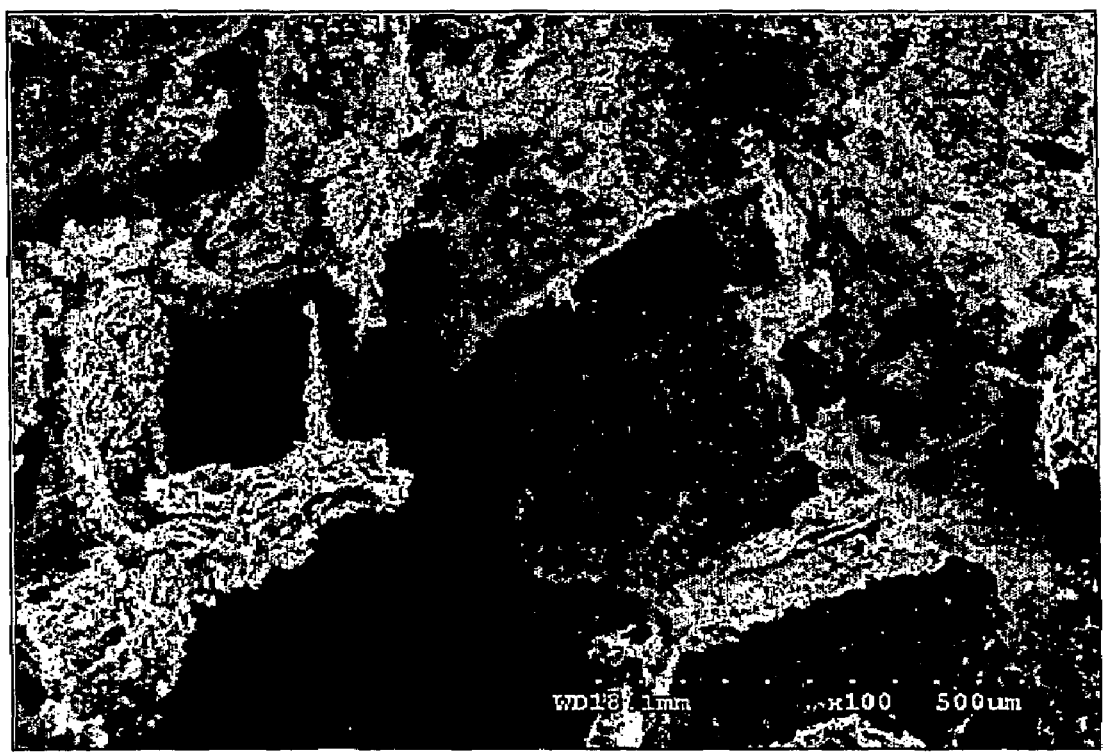
FIGS. 3a-3c show SEM images of the hybrid prepared using the concentration ratio of chitosan to zeolite-Y of 1:5 in Example 5.
Figure 3B:
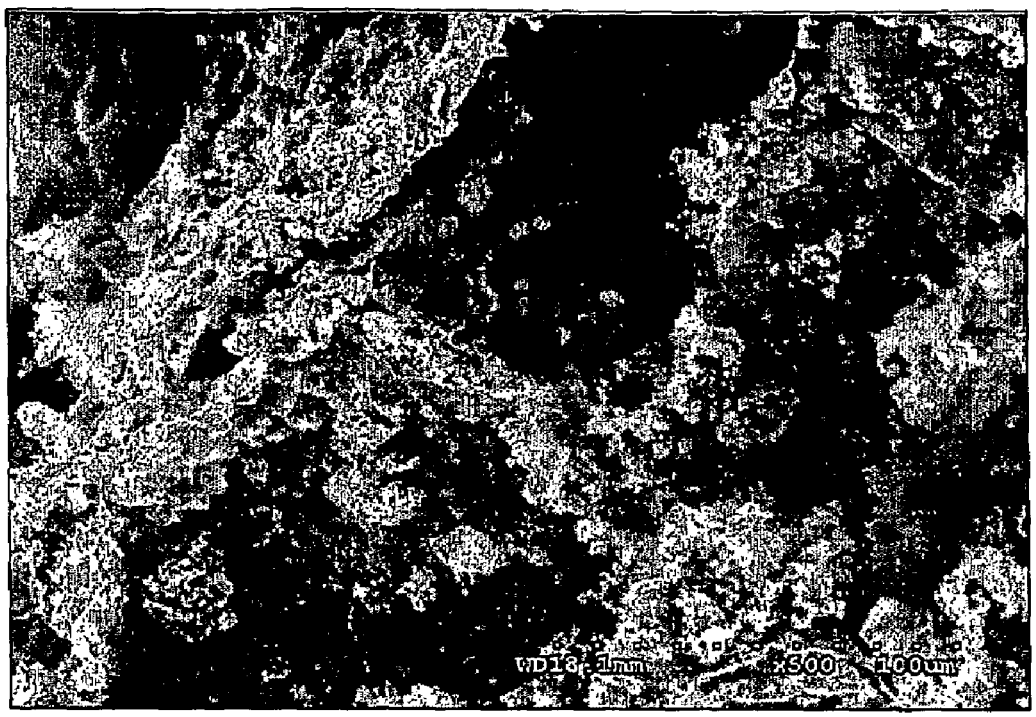
Figure 3C:
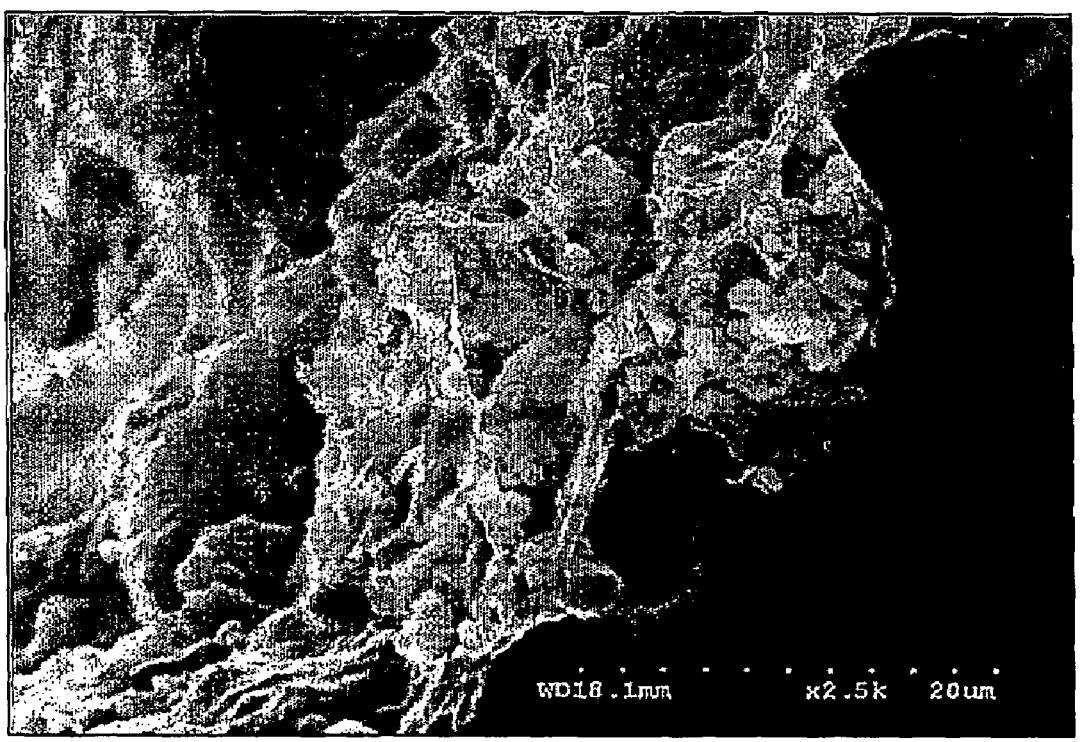
Figure 4:
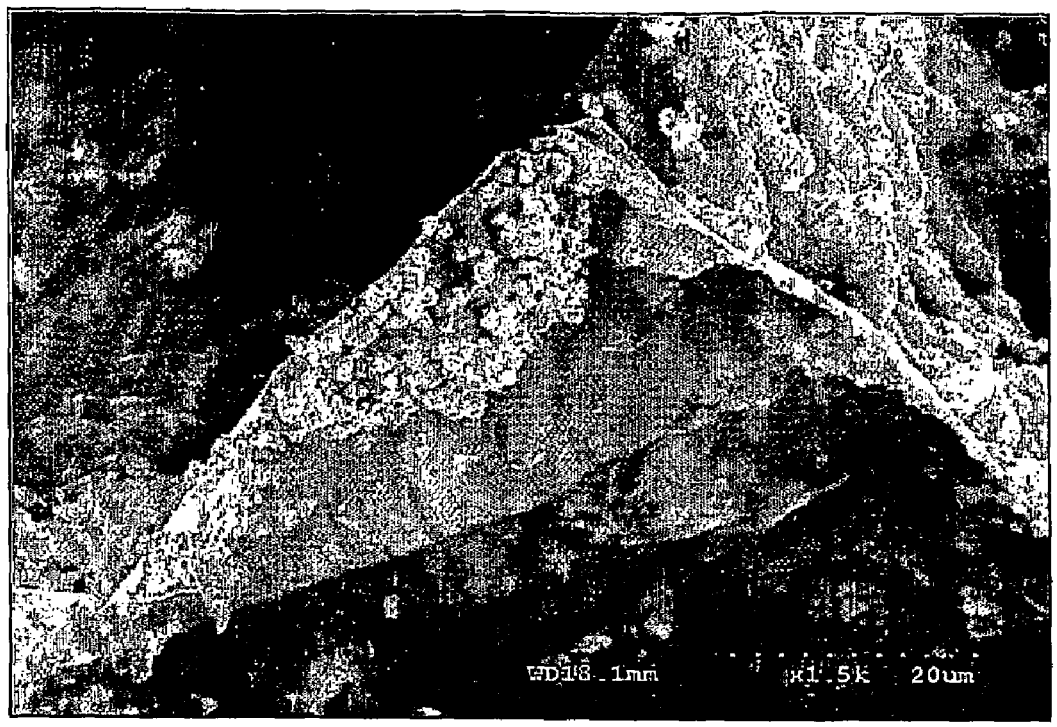
FIG. 4 shows SEM image (1000×) of the hybrid prepared using the concentration ratio of chitosan to zeolite-Y of 1:10 in Example 5.
Figure 5:
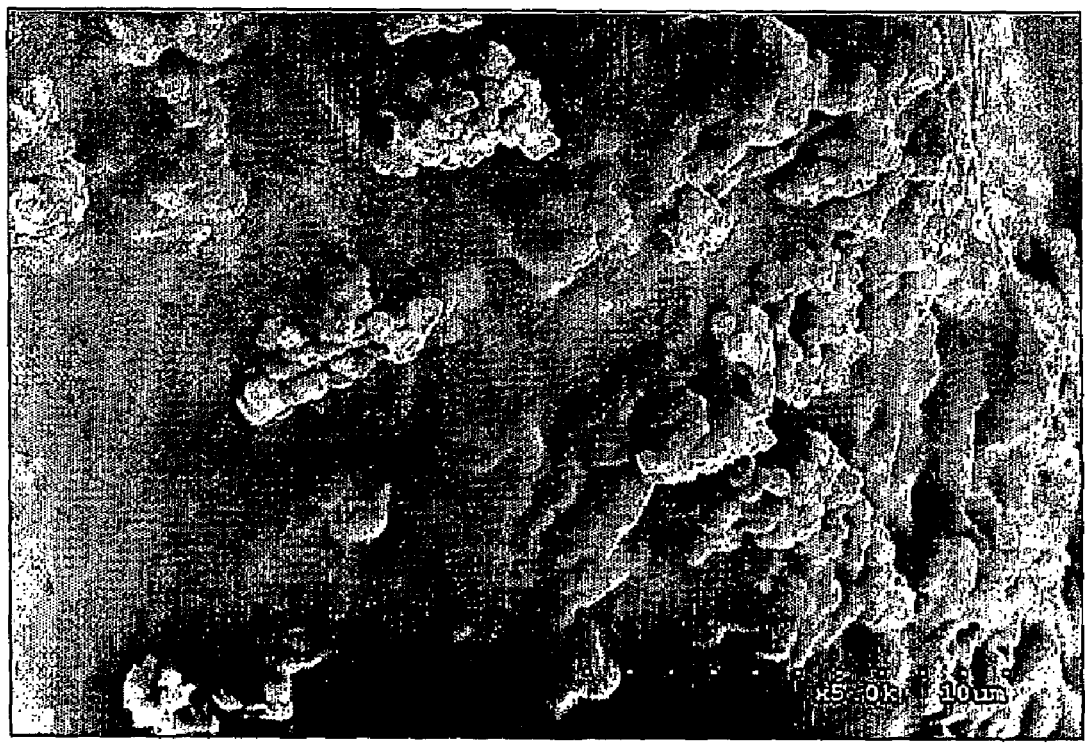
FIG. 5 shows SEM image (50×) of the hybrid prepared using the concentration ratio of chitosan to zeolite-A of 1:1 in Example 5.
Figure 6:
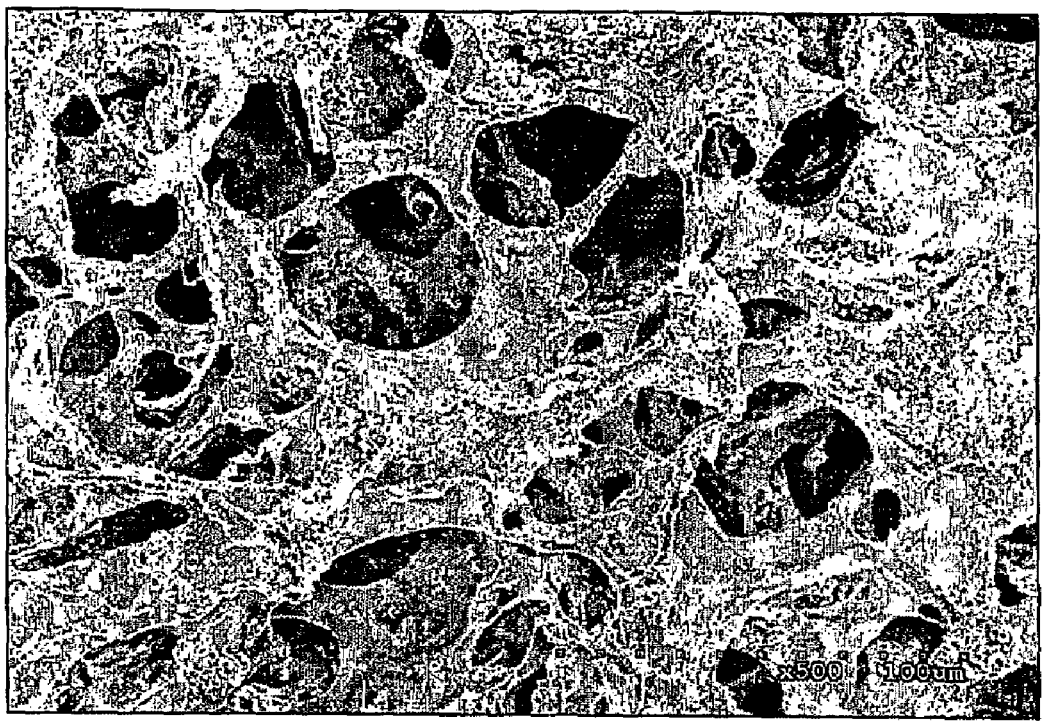
FIG. 6 shows SEM image (500×) of the hybrid prepared using the concentration ratio of chitosan to zeolite-A of 1:2 in Example 5.
Figure 7A:
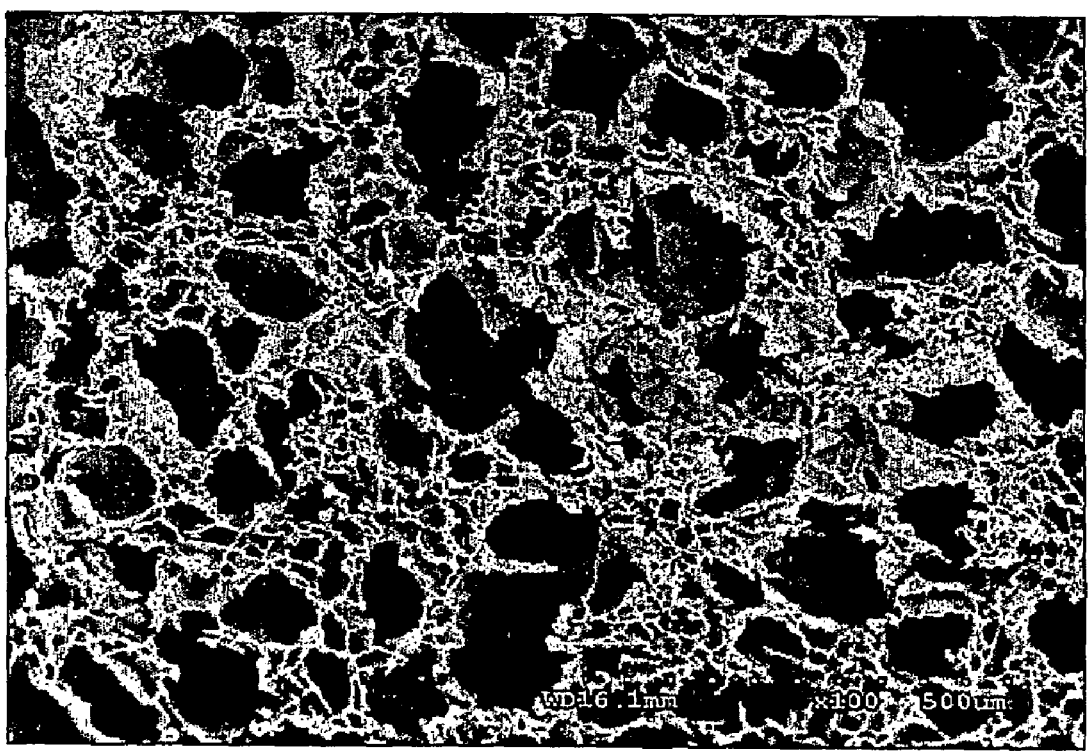
FIGS. 7a-7b show SEM images (100× and 10,000×) of the hybrid prepared using the concentration ratio of chitosan to zeolite-A of 1:5 in Example 5.
Figure 7B:
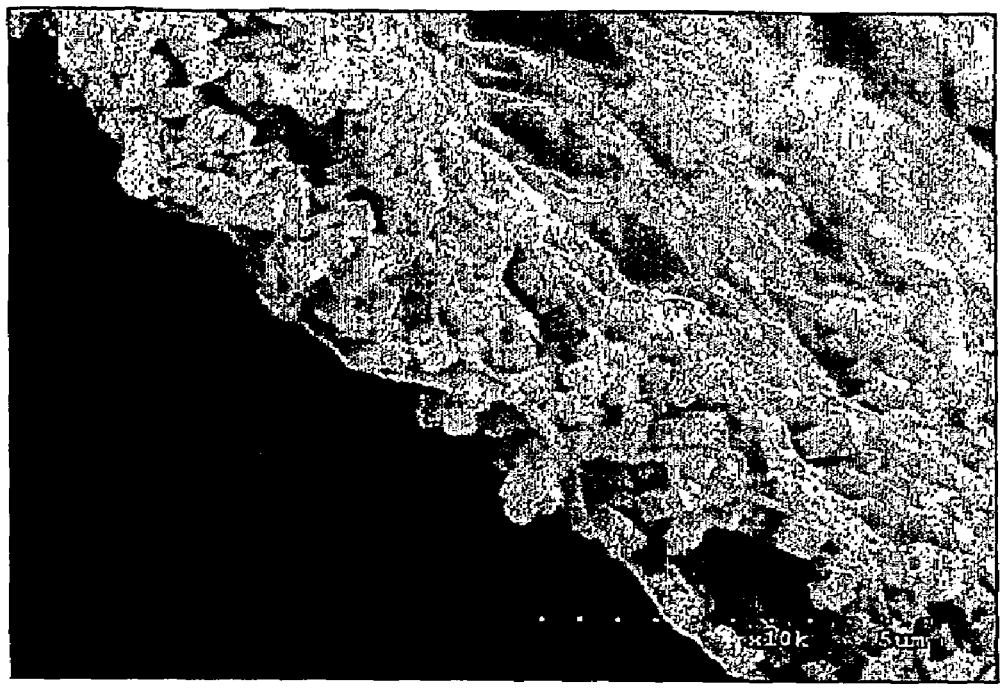
Figure 8A:
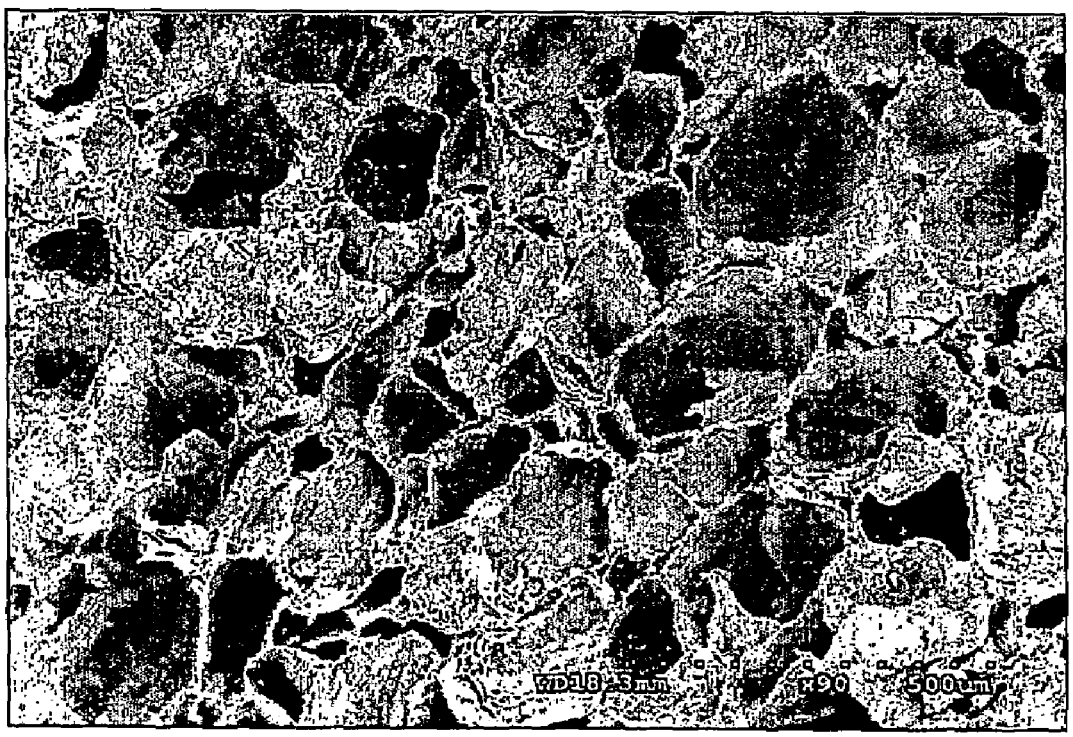
FIGS. 8a-8b show SEM images (90× and 5,000×) of the hybrid prepared using the concentration ratio of chitosan to zeolite-A of 1:10 in Example 5.
Figure 8B:
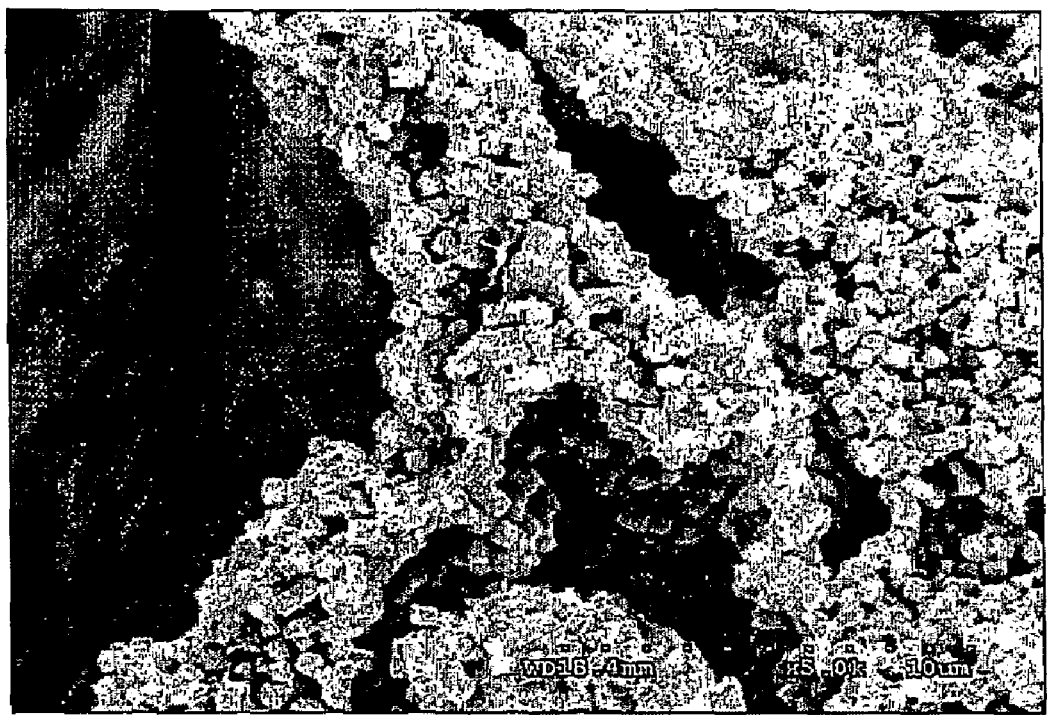
Figure 9A:
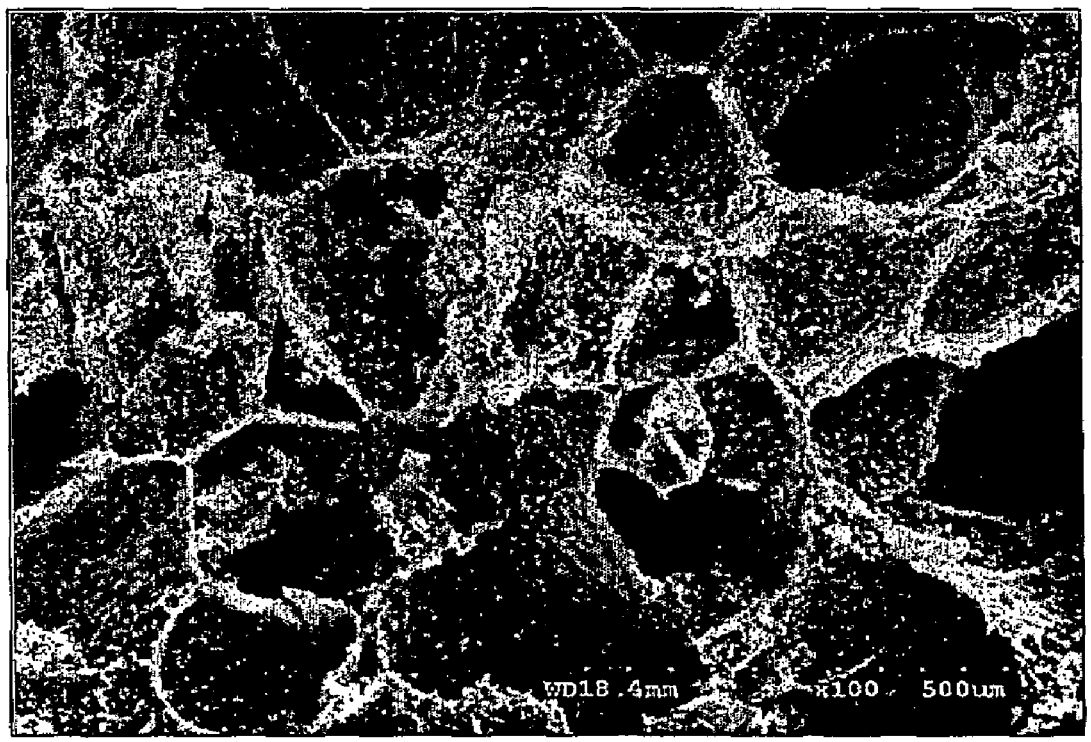
FIGS. 9a-9c show SEM images (100×, 500× and 10,000×) of the hybrid prepared using the concentration ratio of chitosan to zeolite-A of 1:20 in Example 5.
Figure 9B:
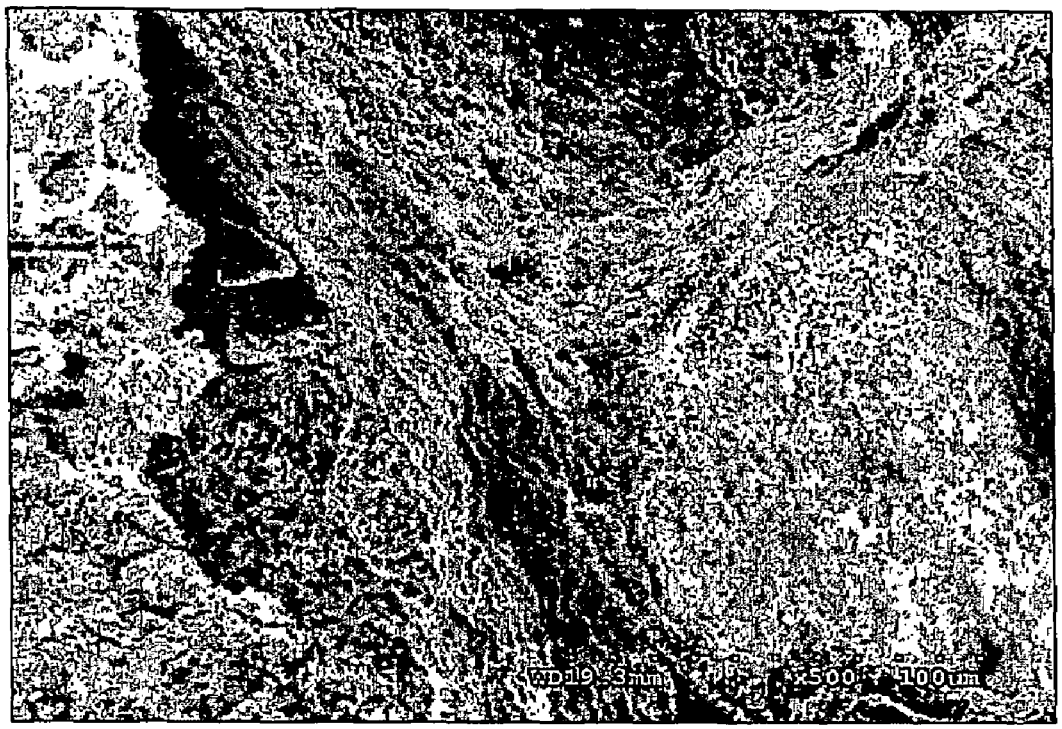
Figure 9C:
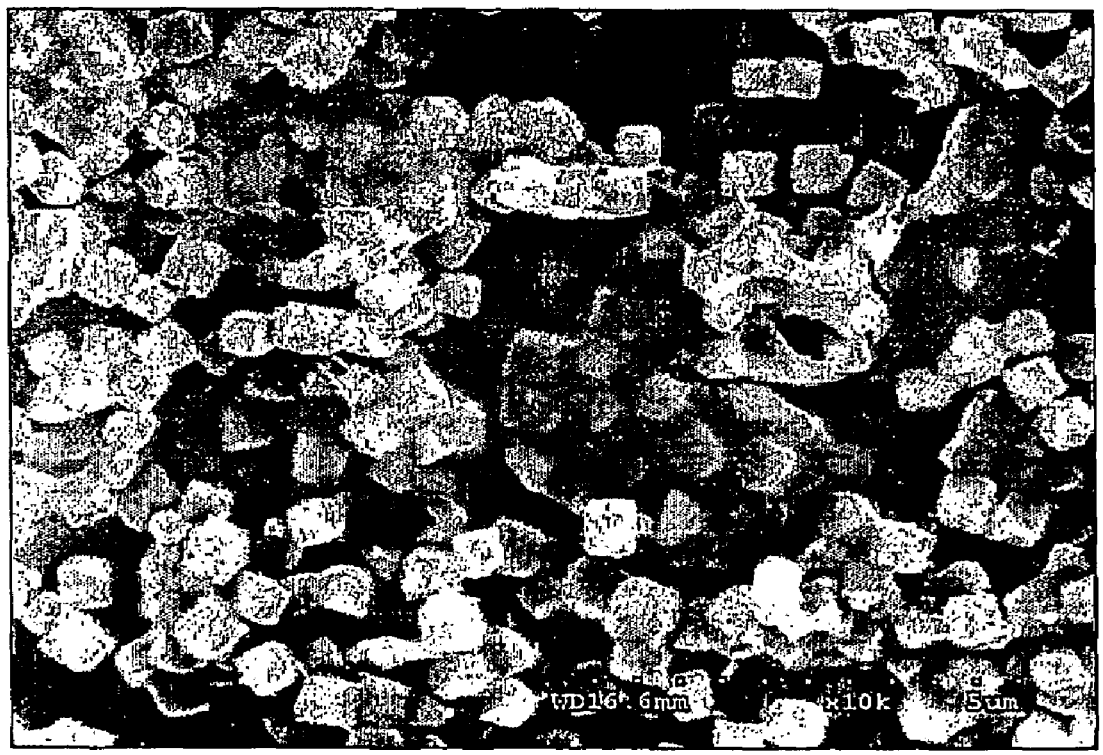

A platinum/palladium coating with a thickness of about 15 nm was placed on the prepared chitosan-linking compound-zeolite, from which SEM (Scanning Electronic Microscope) images were obtained by using a SEM (Hitachi S-4300). The observation results are shown in FIGS. 2a-2c. Figures demonstrate that chitoan molecules are firmly bound to zeolite molecules to form a uniform hybrid.

In addition, as shown in FIGS. 3-9, the thickness of skeletons to form pores becomes increased as increasing the weight ratio of zeolite/chitosan Example 6

Preparation of Porous Hybrid by Forming Covalent Bonds between Chitosan and Linking Compound-Zeolite Intermediate with Introducing Bifunctional Molecule 20 mf of the aminopropyl group-bound zeolite in Example 3 were homogeneously dispersed in distilled water by use of ultrasonicator and mixed with 1 ml of 2% chitosan solution at s suitable concentration. 14 μl of glutaraldehyde [CHO—$(CH_2)_3$—CHO] were added to the mixture for forming the linkages between amine groups bound to zeolite and amine groups of chitosan and then kept to stand over 30 min at room temperature, followed by drying by freeze-dryer, thereby obtaining 40 mg of porous chitosan-linking compound-zeolite hybrid.

Figure 10:
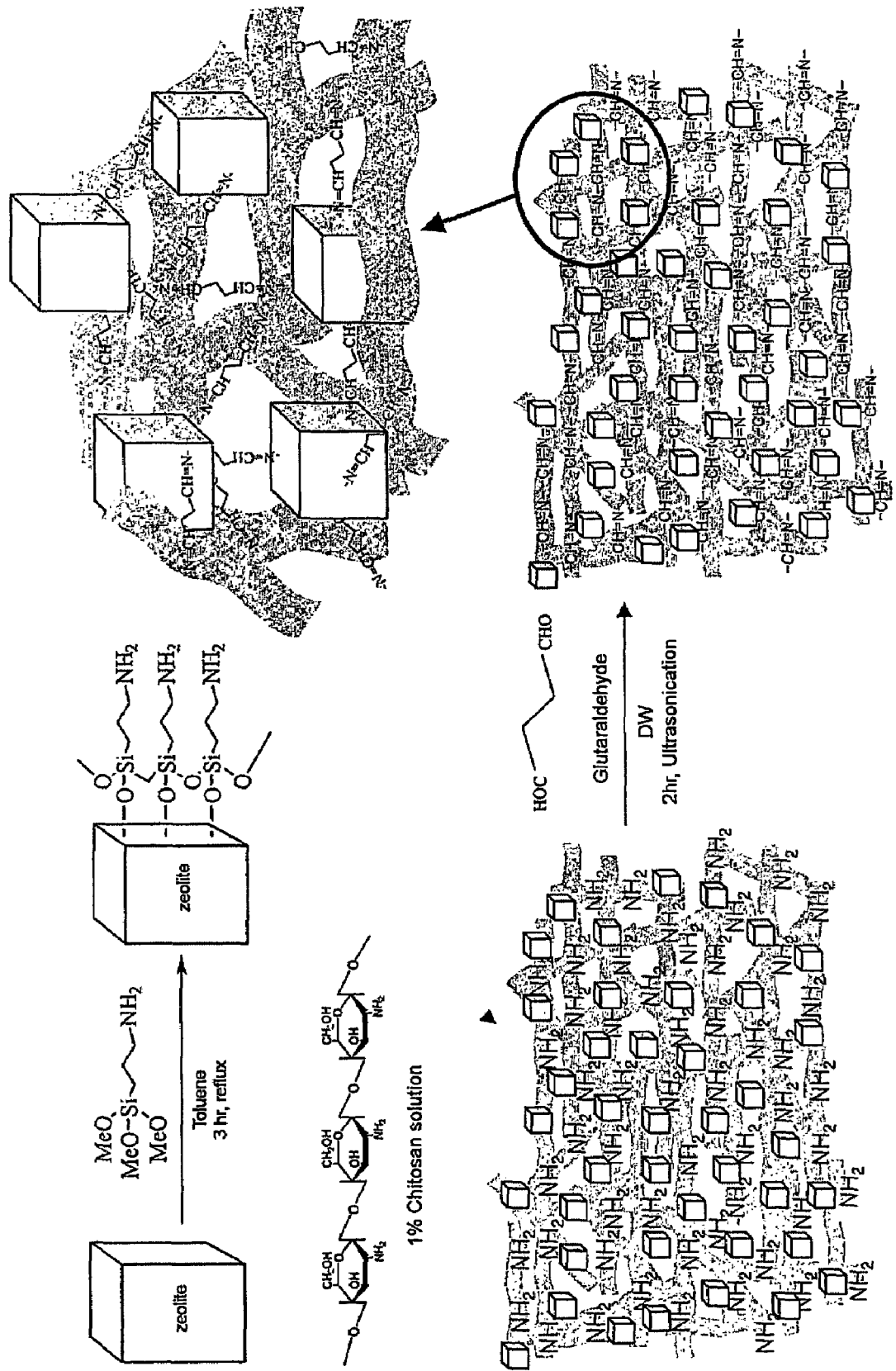
FIG. 10 schematically represents another specific example of the present process to prepare the hybrid.

The processes described in the Example are schematically represented in FIG. 10.

Figure 11A:
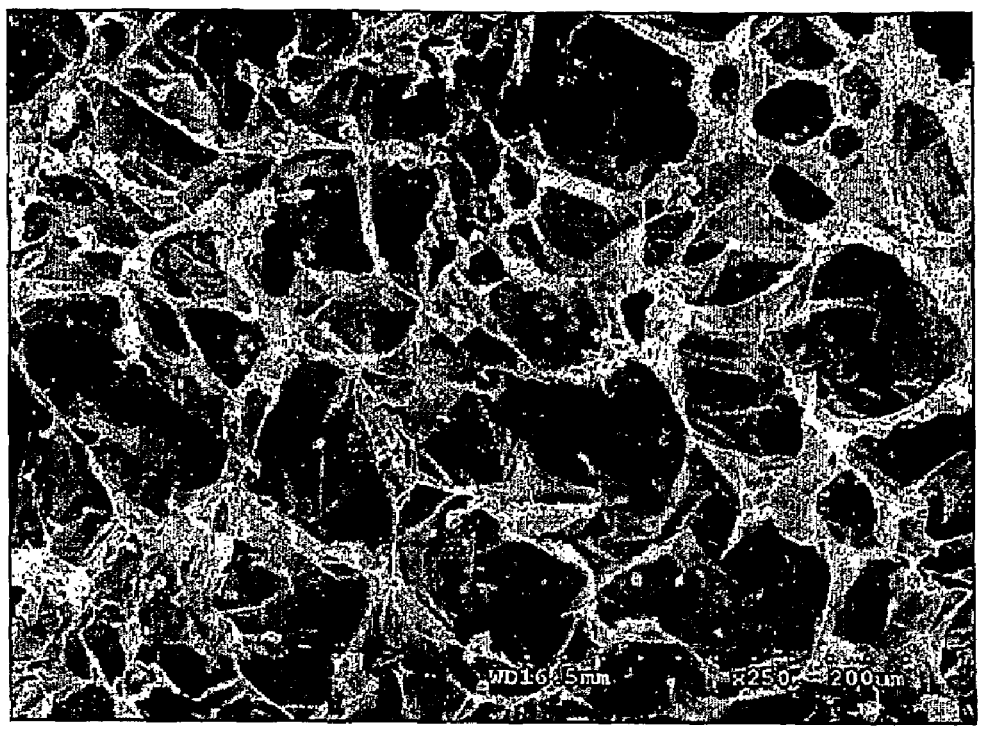
FIGS. 11a-11c show SEM images (250×, 500× and 1000×) of the hybrid prepared using the concentration ratio of chitosan to zeolite-A of 1:1 in Example 6.
Figure 11B:
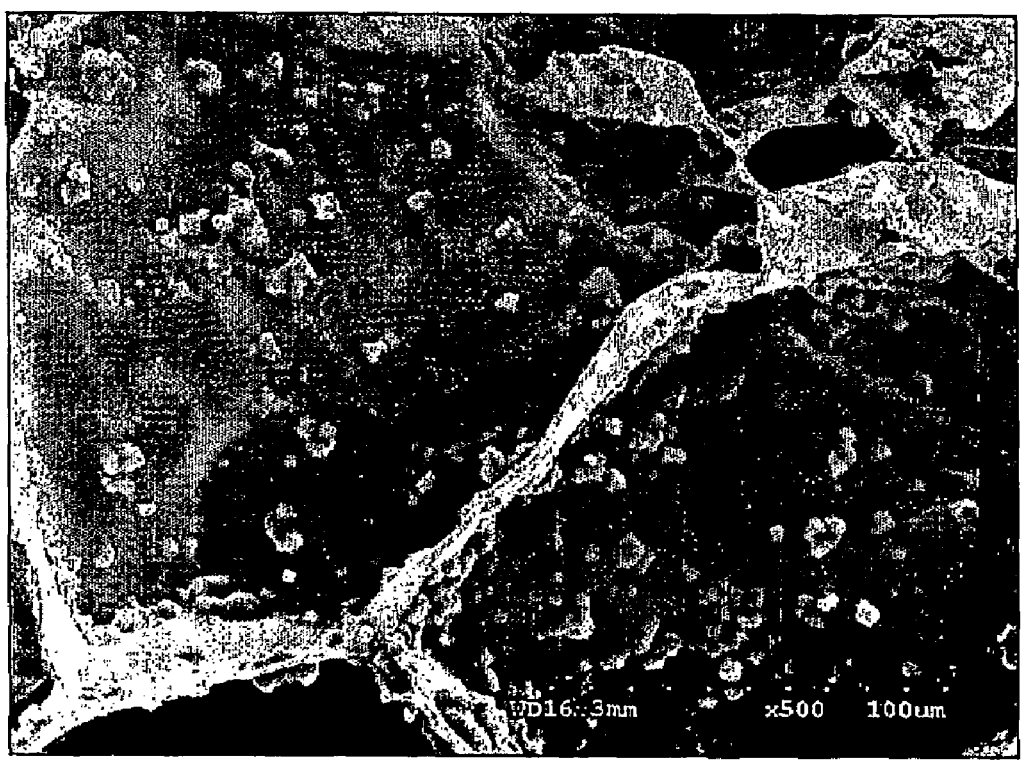
Figure 11C:
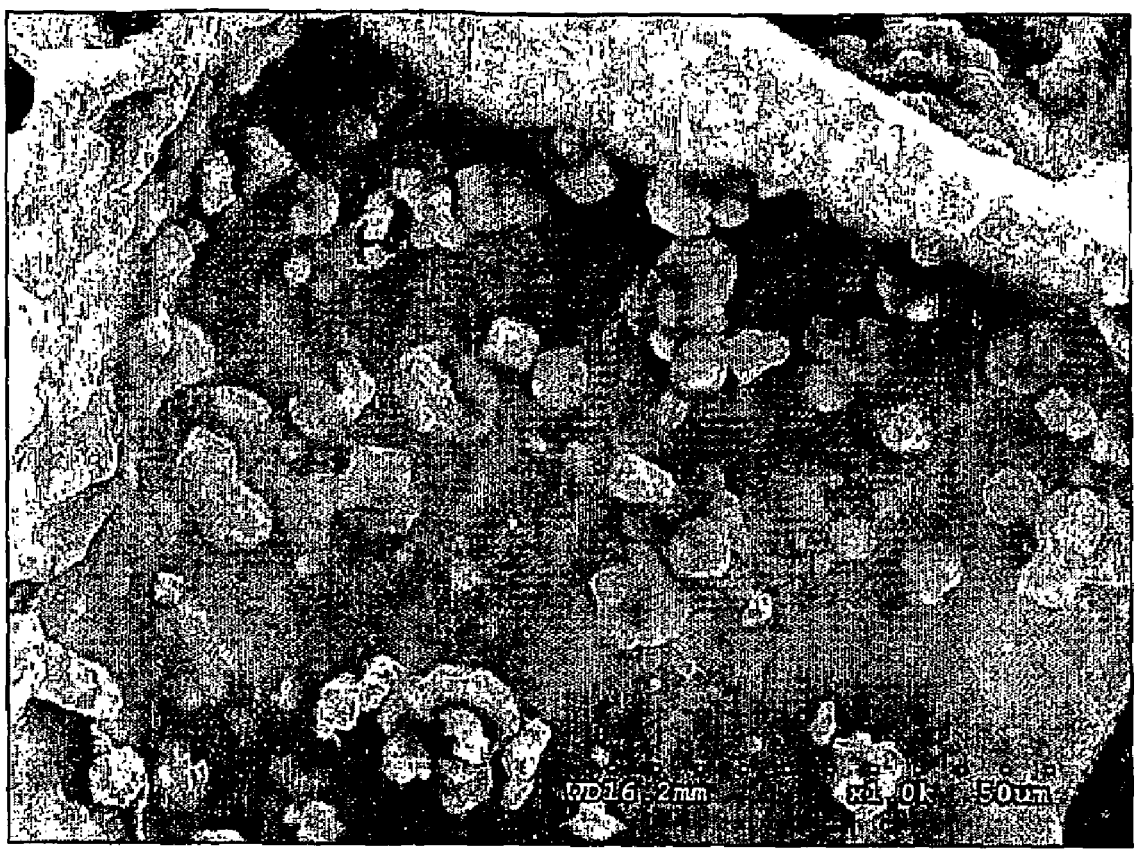

A platinum/palladium coating with a thickness of about 15 nm was placed on the prepared chitosan-linking compound-zeolite, from which SEM (Scanning Electronic Microscope) images were obtained by using a SEM (Hitachi S-4300). The observation results are shown in FIG. 11. Figures reveal that chitoan molecules are firmly bound to zeolite molecules to form a uniform hybrid similar to the hybrid described in Example 5.

Example 7

Preparation of Porous Hybrid by Double Crosslinking between Chitosan and Linking Compound-Zeolite Intermediate The linking compound-zeolite tethered with two types of linking compound, having aldehyde group at its terminal portion, was prepared in accordance with the processes described in Example 4.

Figure 12:
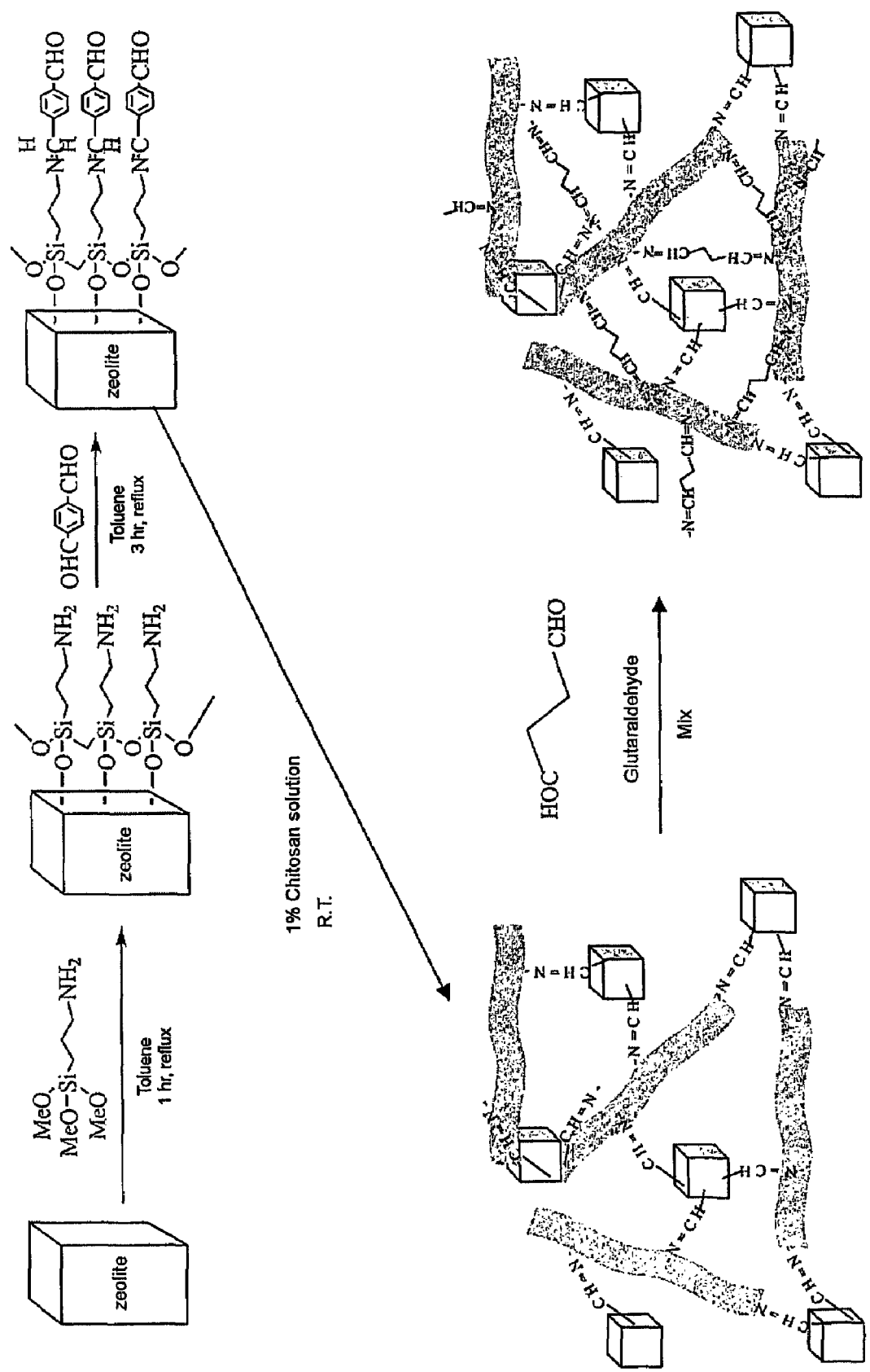
FIG. 12 schematically represents another specific example of the present process to prepare the hybrid.

20 mg of the linking compound-zeolite intermediates were homogeneously dispersed in 1 ml of distilled water by use of ultrasonicator and mixed with 1 ml of 2% chitosan solution with amine function groups. Before completion of the reaction between aldehyde groups on zeolite and amine groups of chitosan, 7 μl of glutaraldehyde were immediately added to the mixture and homogeneously mixed, followed by standing over 30 min at room temperature. The resultant was frozen and dried with freeze-dryer, yielding 40 mg of porous chitosan-linking compound-zeolite hybrid. The processes described in the Example are schematically represented in FIG. 12.

Figure 13A:
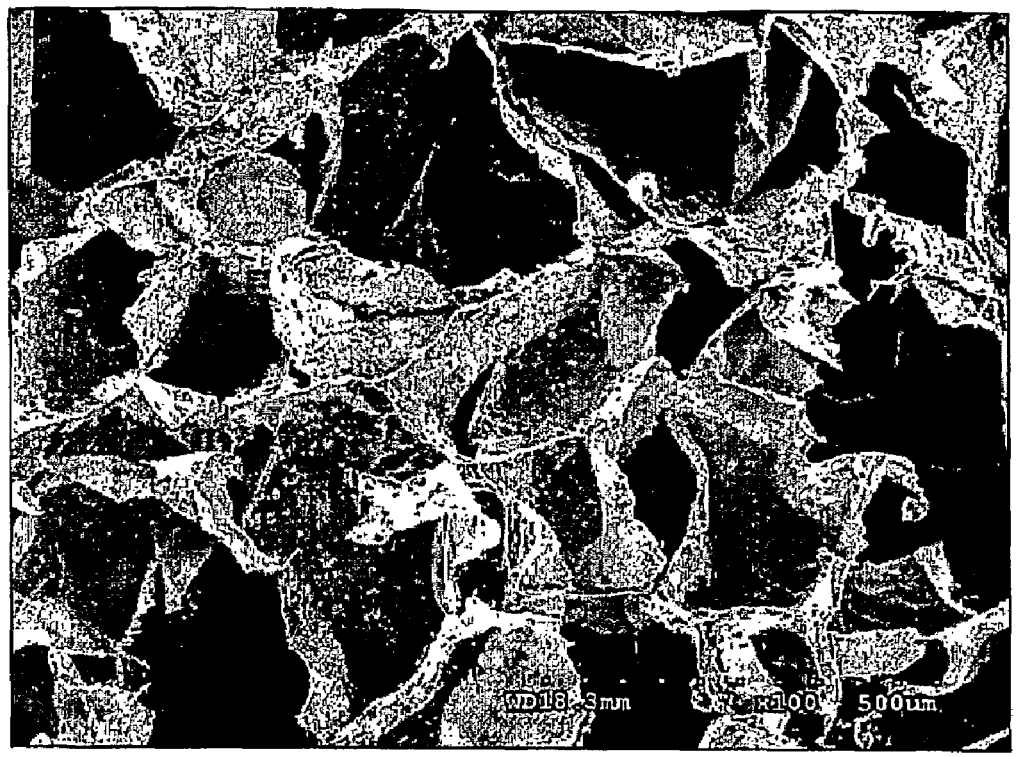
FIGS. 13a-13b show SEM images (100× and 700×) of the hybrid prepared using the concentration ratio of chitosan to zeolite-A of 1:1 in Example 7.
Figure 13B:
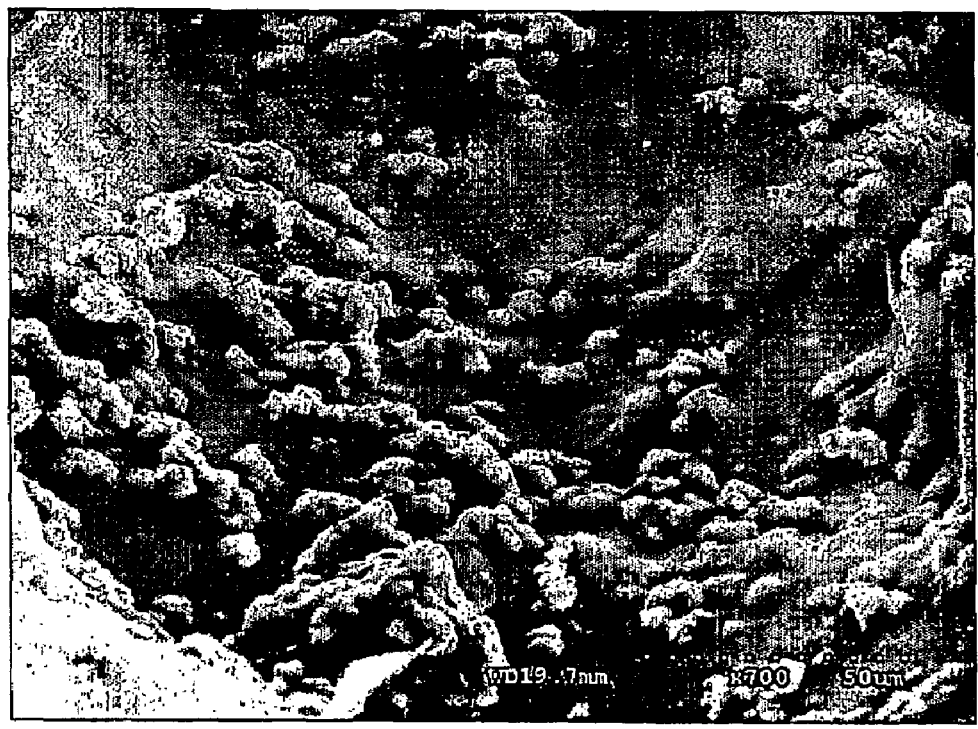

A platinum/palladium coating with a thickness of about 15 nm was placed on the double-crosslinked chitosan-linking compound-zeolite, from which SEM (Scanning Electronic Microscope) images were obtained using a SEM (Hitachi S-4300). The observation results are shown in FIG. 13. Figures represent that the hybrid prepared in this Example has a microstructure similar to those of Examples 5 and 6.

Example 8

Figure 14:
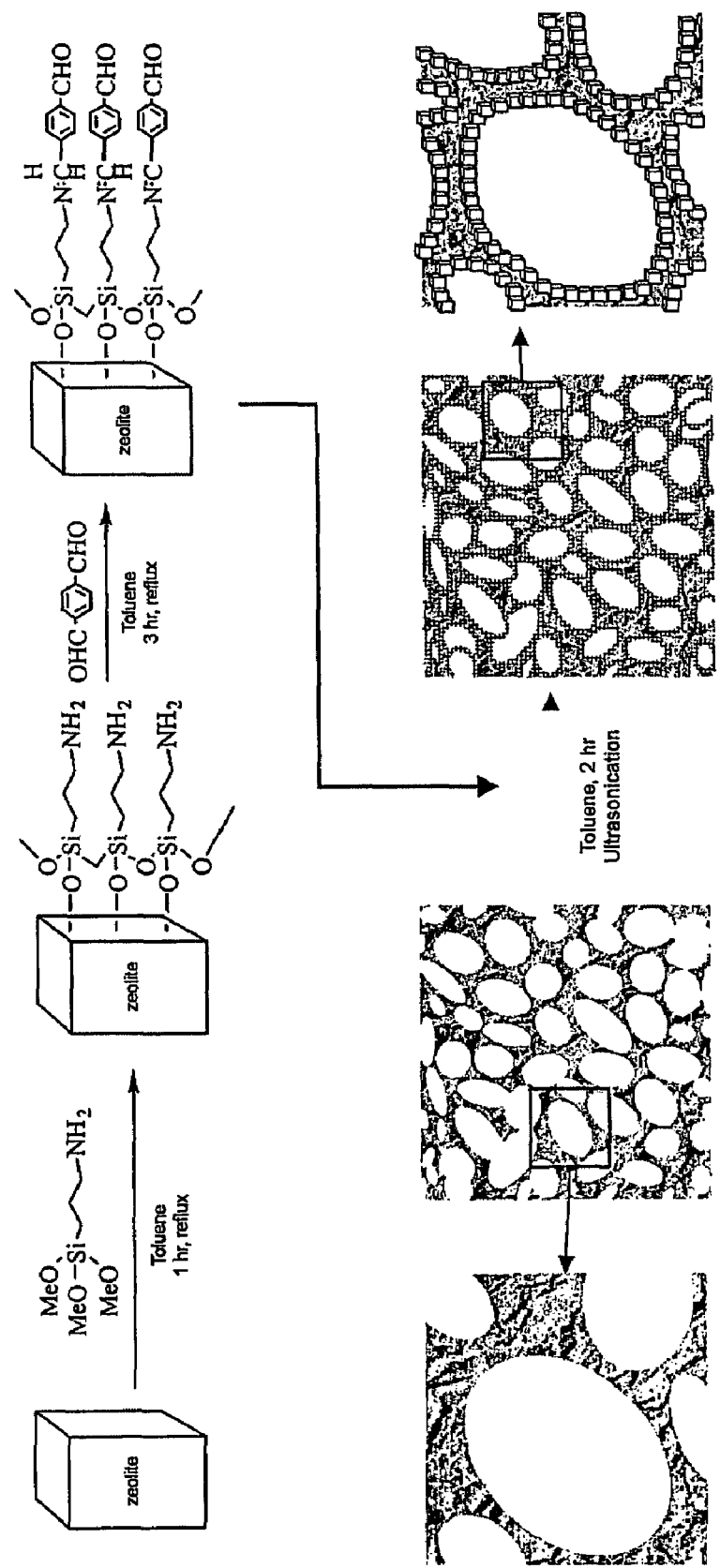
FIG. 14 schematically represents another specific example of the present process to prepare the hybrid.

Preparation of Porous Hybrid by forming Covalent Bonds between Linking Compound-Zeolite and Chitosan Sponge 2 ml of 1% chitosan solution contained in vessel were frozen and dried with freeze-dryer, giving 20 mg of chitosan sponge. 100 mg of zeolite tethered with aminopropyl trimethoxysilane and tetraphthaldicarboxaldehyde were added to 20 ml of toluene and homogeneously dispersed by use of ultrasonicator. The chitosan sponge was added to the zeolite dispersion and the treatment for forming linkages between functional groups of chitosan and zeolite was carried out by heating for 2 hr at 110° C. or ultrasonification over 1 hr. After completion of the reaction, the hybrid prepared was washed several times with toluene in ultrasonicator and dried under vacuum, obtaining about 30-40 mg of porous chitosan-linking compound-zeolite hybrid. The processes described in the Example are schematically represented in FIG. 14.

Figure 15A:
FIGS. 15a-15b show SEM images (500× and 2500×) of the hybrid prepared using chitosan and zeolite-A in Example 6.
Figure 15B:
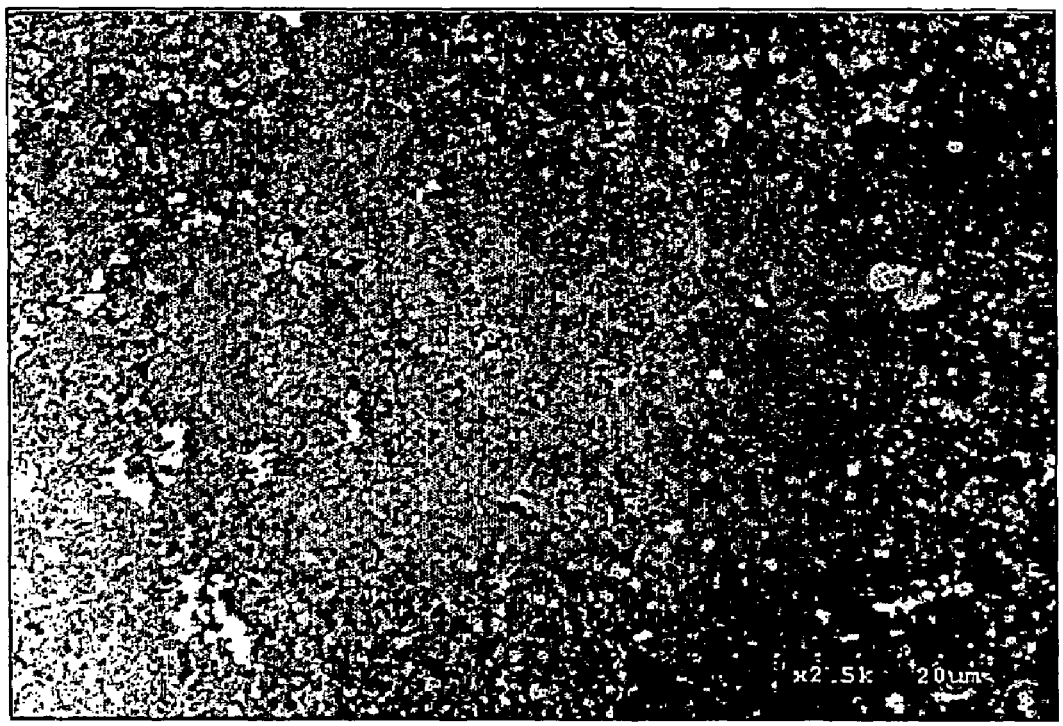

A platinum/palladium coating with a thickness of about 15 nm was placed on the prepared chitosan-linking compound-zeolite, from which SEM (Scanning Electronic Microscope) images were obtained by using a SEM (Hitachi S-4300). The observation results are shown in FIGS. 15a-15b. Unlike the hybrids prepared in Examples 5 and 6, zeolite crystals are not incorporated into chitosan skeleton but attached to the outer surface of chitosan skeleton to form a monolayer.

Example 9

Evaluation on Anionic and Cationic Dye Adsorption Using Chitosan-Linking Compound-Zeolite Hybrid 40 mg of the cylindrical chitosan-linking compound-zeolite hybrid (diameter 16 mm, depth 10 mm) prepared in accordance with the processes as described in Example 5 were placed into a reaction vessel containing 50 ml of a dye solution consisting of 8.32 μM cationic dye, methylene blue (Aldrich Chemical Co., Inc.) and 147 μM anionic dye, methyl orange (Aldrich Chemical Co., Inc.) and adsorption was then proceeded with shaking. When the adsorption reaction to dye was in equilibrium, the cylindrical hybrid was taken out and the absorbance of remaining solution was measured at 665 nm for methylene blue or at 465 nm for methyl orange, evaluating water purification effect of the hybrid.

Figure 16:
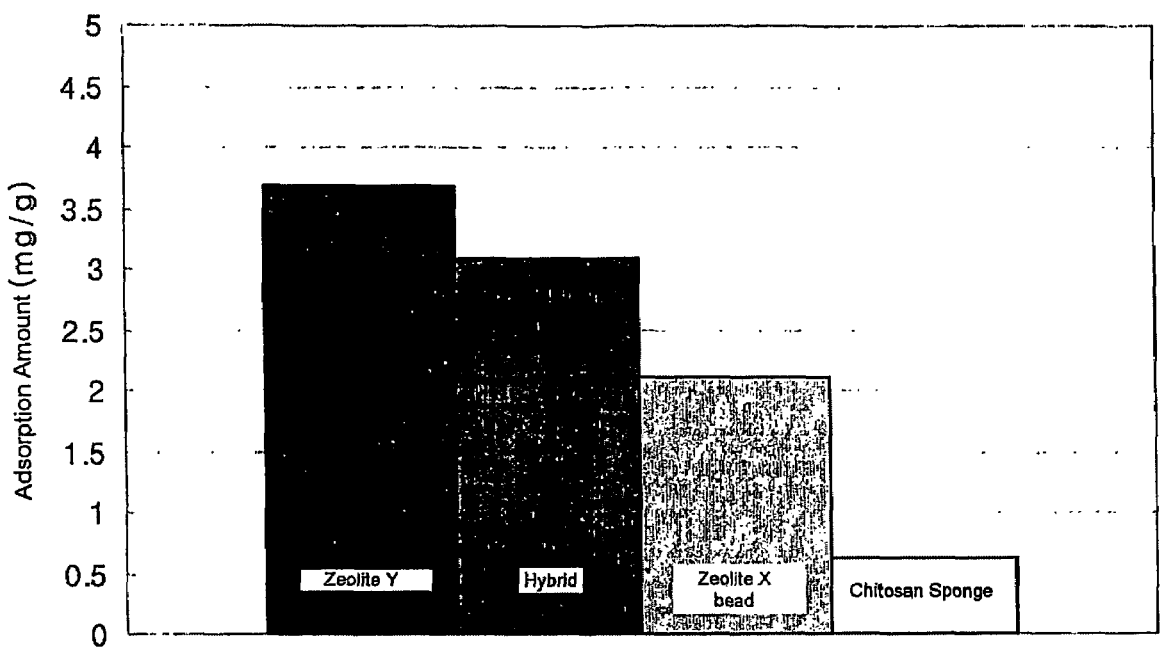
FIG. 16 is a graph representing the adsorption capacity of the present hybrid to anionic dye, methyl orange, described in Example 9.
Figure 17:
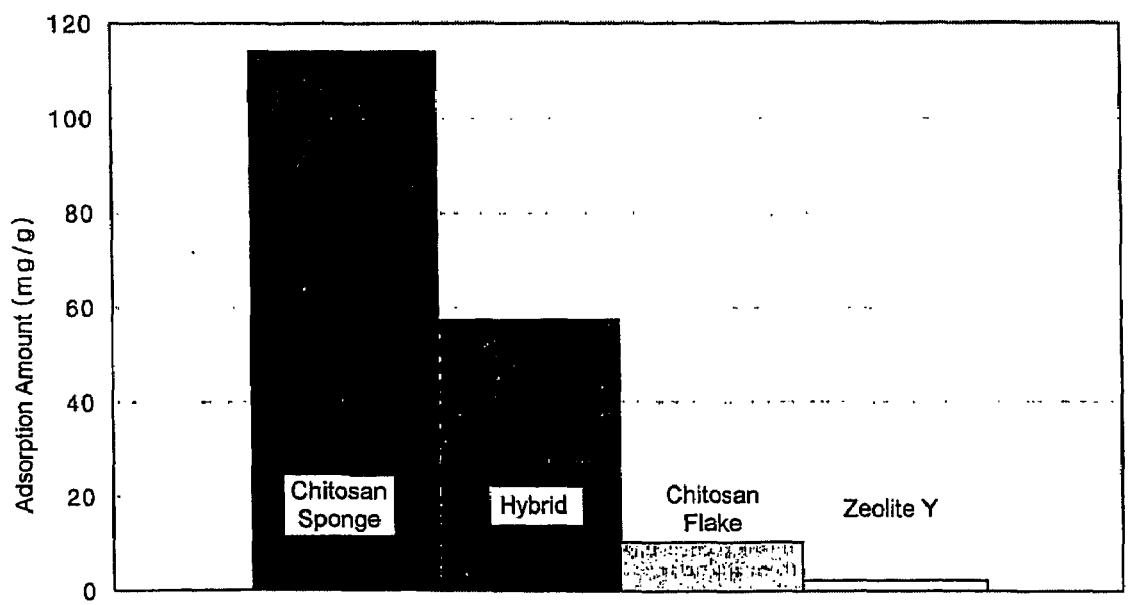
FIG. 17 is a graph representing the adsorption capacity of the present hybrid to cationic dye, methylene blue, described in Example 9.

Since zeolite Y showed higher adsorption capacity to methylene blue than zeolite A, the subsequent experiments for adsorption to methylene blue were conducted using zeolite Y hybrid. For comparison, zeolite Y powder, zeolite X bead (Aldrich Chemical Co., Inc.), chitosan sponge and chitosan flake as a control group were evaluated in terms of adsorption capacity. The results of adsorption experiments are found in FIG. 16 (for cationic dye, methylene blue) and FIG. 17 (for anionic dye, methyl orange).

As represented in graphs, the adsorption experiments to methylene blue using the same amount elucidate that the hybrid of this invention shows the adsorption amount of 3.1 mg/g, which may be considered remarkable in considering the fact that the amount of zeolite in the hybrid is half of bare zeolite powder showing the adsorption amount of 3.7 mg/g. Zeolite X beads with pores larger than zeolite Y exhibit much lower adsorption amount than the hybrid of this invention. In experiments on methyl orange, the hybrid of this invention shows the adsorption amount of 57.25 mg/g and glutaraldehyde-crosslinked chitosan sponge shows the adsorption amount of 114 mg/g. Therefore, it would be recognized that the adsorption capacity of the hybrid is just as good as chitosan sponge in considering the fact that the amount of chitsan in the hybrid is half of chitosan sponge.

Example 10

Evaluation on Heavy Metal Adsorption Using Chitosan-Linking Compound-Zeolite Hybrid 40 mg of the cylindrical chitosan-linking compound-zeolite hybrid formed in accordance with the processes as described in Example 5 were placed into a reaction vessel containing 50 ml of 1 mM lead nitrate solution and adsorption was then proceeded with agitating. When the adsorption reaction to heavy metal ions was in equilibrium, the cylindrical hybrid was taken out and the remaining solution was analyzed by elemental analysis or titration using lead-selective electrode, evaluating water purification effect of the hybrid.

Figure 18:
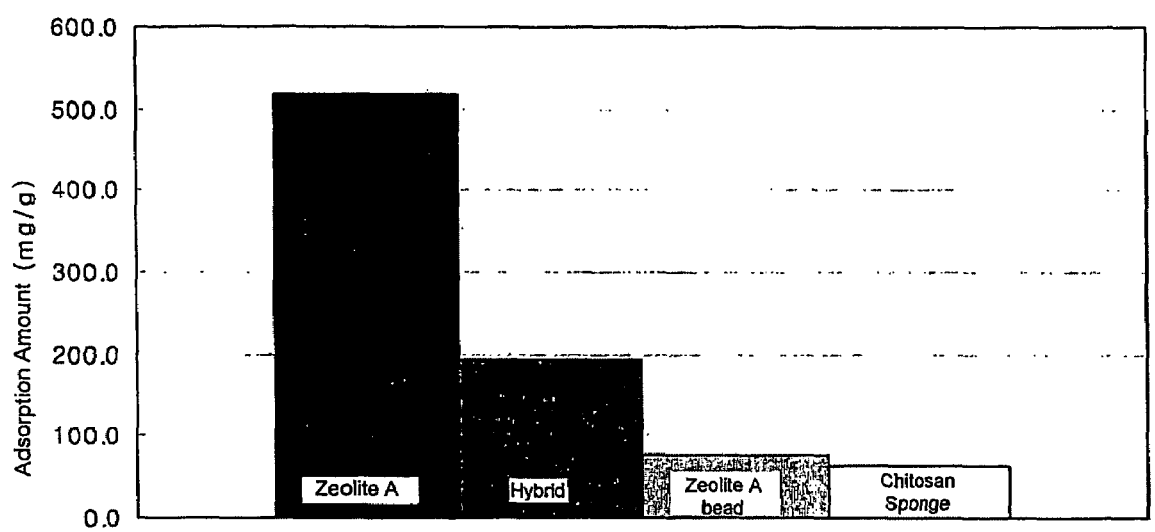
FIG. 18 is a graph representing the adsorption capacity of the present hybrid to lead ions described in Example 10.

Since zeolite A showed higher adsorption capacity to lead ion than zeolite Y, the subsequent experiments for adsorption to lead ion were conducted using zeolite A hybrid. For comparison, zeolite A powder, zeolite A bead (Aldrich Chemical Co., Inc.), chitosan sponge and chitosan flake as a control group were evaluated in terms of adsorption capacity. The results of adsorption experiments to lead ion are found in FIG. 18. As represented in graphs, the adsorption experiments to lead ion using the same amount elucidate that the hybrid of this invention shows the adsorption amount of 194.3 mg/g, which may be considered remarkable in considering the fact that the amount of zeolite in the hybrid is half of bare zeolite A powder. Zeolite A beads exhibit much lower adsorption amount than the hybrid of this invention.

Example 11

Evaluation on Ion Adsorption Using Fixed-Bed Filter Charged with Chitosan-Linking Compound-Zeolite Hybrid According to the processes as described in Example 5, 240 mg of the chitosan-linking compound-zeolite hybrid consisting of 160 mg of linking compound-zeolite Y and 80 mg of chitosan, were prepared in a volume of 3.5 ml. The hybrid with a diameter equal to that of filter was charged into fixed-bed filter with a volume of 8 ml.

Figure 19:
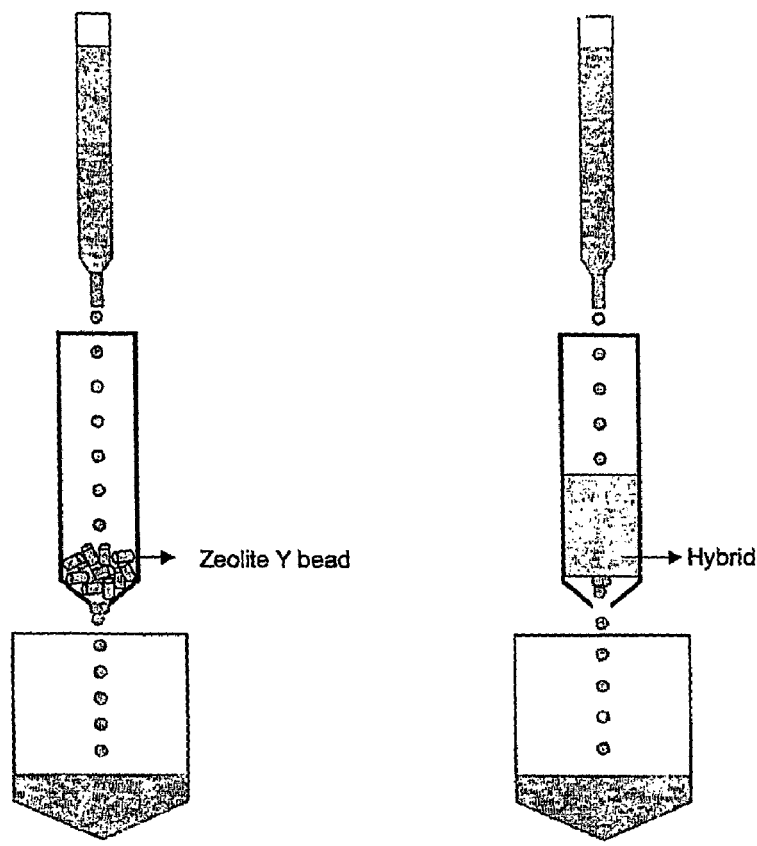
FIG. 19 schematically represents the application of the present porous hybrid.

50 ml of 6.65 µM methylene blue solution were passed through the filter at a velocity of 50 ml/30 min in order to examine adsorption capacity. Since zeolite Y powder is not compatible with fixed-bed filter, bare zeolite Y beads (Zeobuilder) for comparison experiments were charged into the filter. Where the bare zeolite Y beads are used in the same amount as the hybrid, their volume in fixed-bed filter is so small that the adsorption capacity becomes sharply dropped because the bare zeolite Y beads have considerably high density. Therefore, the bare zeolite Y beads were charged in the amount of two-fold larger than that of the hybrid. The process of this Example is schematically represented in FIG. 19.

Figure 20:
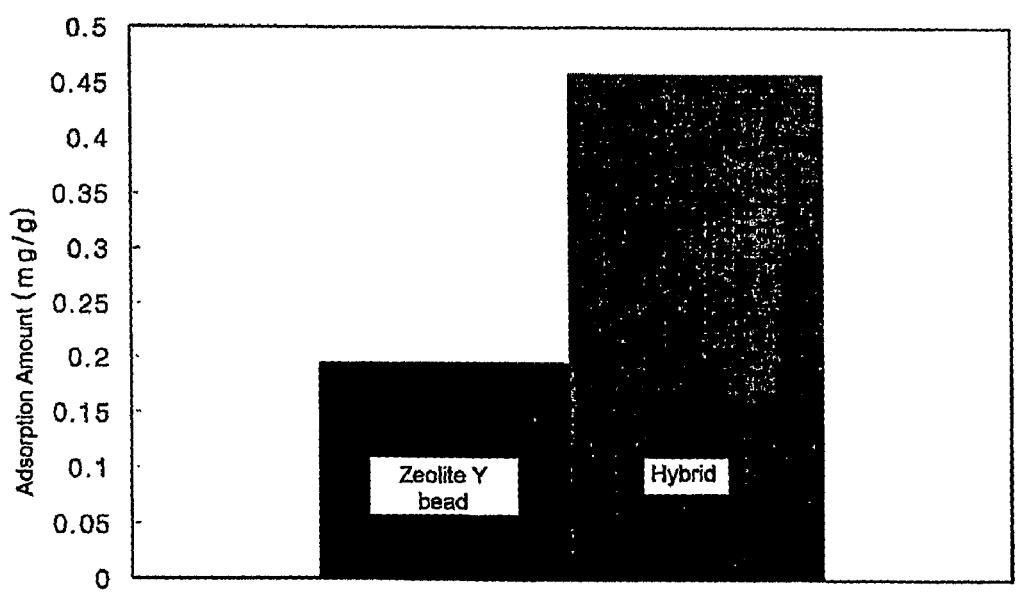
FIG. 20 represents the comparison of filtration capacities of the present hybrid in fixed-bed filter.

The concentration of methylene blue in the resulting filtrate was measured by UV/vis spectrophotometer. As shown in FIG. 20, the hybrid containing zeolite and chitosan at a weight ratio of 2:1 exhibits the adsorption capacity of 0.4579 mg/g of adsorptive and zeolite Y beads exhibit the adsorption capacity of 0.195 mg/g of adsorptive, demonstrating that the hybrid of this invention has excellent adsorption capacity.

The present invention provides a process for preparing a porous chitosan-linking compound-zeolite hybrid and a porous chitosan-linking compound-zeolite hybrid prepared by the same. In addition, the present invention provides an adsorbent capable of removing both cationic and anionic substances and a method for purifying water using the same. The chitosan-linking compound-zeolite hybrid of this invention has macropores and higher mechanical strength, so that it is able to remove ions present in liquid and gas samples in higher efficient.

Having described a preferred embodiment of the present invention, it is to be understood that variants and modifications thereof falling within the spirit of the invention may become apparent to those skilled in this art, and the scope of this invention is to be determined by appended claims and their equivalents.

REFERENCES

[1] S. E. Bailey, T. J. Olin, R. M. Bricka, D. D. Adrian, *Wat. Res.* 1999, 11, 2469-2479
[2] E. Guibal, C. Milot, J. M. Tobin, *Ind. Eng. Chem. Res.* 1998, 37, 1454-1463
[3] F.-C. Wu, R.-L. Tseng, R.-S. Juang, *J. Hazard. Mater.* B81 2001, 167-177
[4] F.-C. Wu, R.-L. Tseng, R.-S. Juang, *J. Hazard. Mater.* B73 2000, 63-75
[5] M.-S. Chiou, H.-Y. Li, *J. Hazard. Mater.* B93 2002, 233-248
[6] R.-S. Juang, R.-L. Tseng, F.-C. Wu, S.-H. Lee, *J. Chem. Tech. Biotechnol.* 1997, 70, 391-399
[7] M. S. Masri, F. W. Reuter, M. Friedman, *J. Appl. Polym. Sci.* 1974, 18, 675-681
[8] G. L. Rorrer, T.-Y. Hsien, J. D. Way, *Ind. Eng. Chem. Res.* 1993, 32, 2170-2178
[9] E. Guibal, C. Milot, J. M. Tobin, *Ind. Eng. Chem. Res.* 1998, 37, 1454-1463
[10] T.-Y. Hsien, G. L. Rorrer, *Ind. Eng. Chem. Res.* 1997, 36, 3631-3638
[11] L. Jin, R. Bai, *Langmuir* 2002, 18, 9765-9770
[12] W. S. W. Ngah, K. H. Liang, *Ind. Eng. Chem. Res.* 1999, 38, 1411-1414
[13] R.-S. Juang, C.-Y. Ju, *Ind. Eng. Chem. Res.* 1997, 36, 5403-5409
[14] R.-S. Juang, C.-Y. Ju, *Ind. Eng. Chem. Res.* 1998, 37, 3463-3469
[15] M, Rinaudo, G. Pavlov, J. Desbrieres, *Polymer* 40, 1999, 7029-7032
[16] M. S. Masri, V. G. Randall, A. G. Pittman, *ACS Polym. Repr.* 1978, 19, 483-488
[17] A. Kulak, Y.-J. Lee, Y. S. Park, and K. B. Yoon. *Angew. Chem. Int. Ed.* 2000, 39, 950-953
[18] S. Y. Choi, Y.-J. Lee, Y. S. Park, K. Ha, K. B. Yoon, *J. Am. Chem. Soc.* 2000, 122, 5201-5209.
[19] G. S. Lee, Y.-J. Lee, K. Ha, K. B. Yoon, *Tetrahedron,* 2000, 56 (36), 6965-6968
[20] K. Ha, Y.-J. Lee, H. J. Lee, K. B. Yoon, *Adv. Mater.* 2000, 12 (15), 1114-1117.
[21] K. Ha, Y.-J. Lee, D.-Y. Jung, J. H. Lee and K. B. Yoon, *Adv. Mater.* 2000, 12 (21), 1610-1614.
[22] A. Kulak, Y. S. Park, Y.-J. Lee, Y. S. Chun, K. Ha, and K. B. Yoon, *J. Am. Chem. Soc.* 2000, 122, 9308-9309.
[23] G. S. Lee, Y.-J. Lee, S. Y. Choi, Y. S. Park, and K. B. Yoon, *J. Am. Chem. Soc.* 2000, 122, 12151-12157.

[24] G. S. Lee, Y.-J. Lee, K. B. Yoon, *J. Am. Chem. Soc.* 2001, 123, 9769-9779.
[25] G. S. Lee, Y.-J. Lee, K. Ha, K. B. Yoon, *Adv. Mater.* 2001, 13 (19), 1491-1495.
[26] S. H. Um, G. S. Lee, Y.-J. Lee, K. K. Koo, C. M. Lee, and K. B. Yoon, *Langmuir.* 2002, 18, 4455-4459.
[27] Y. S. Chun, K. Ha, Y.-J. Lee, J. S. Lee, H. S. Kim, Y. S. Park, and K. B. Yoon, *Chem. Comm.* 2002, 1846-1847.
[28] J. S. Park, G. S. Lee, Y.-J. Lee, Y. S. Park, and K. B. Yoon *J. Am. Chem. Soc.* 2002, 124, 13366-13367.

What is claimed is:

1. A process for preparing a porous chitosan-linking compound-zeolite hybrid, comprising the steps of:
    (a) forming a linking compound-zeolite intermediate by linking a linking compound to the surface of zeolite; and
    (b) preparing said chitosan-linking compound-zeolite hybrid by reacting said linking compound-zeolite intermediate with chitosan or a linking compound-chitosan.

2. The process according to claim 1, wherein said process further comprises the step of preparing a double-crosslinked chitosan-linking compound-zeolite hybrid by reacting a bifunctional compound with said chitosan-linking compound-zeolite hybrid after the final step.

3. The process according to claim 2, wherein said bifunctional compound for double crosslinking is selected from the group consisting of the compounds represented by the following formulae:

X—L—X  Formula 1 

Y—L—Y  Formula 2 

L—Y  Formula 3 

Y—Y, and  Formula 4 

X—L  Formula 5 

wherein L represents a substituted or unsubstituted $C_1$-$C_{17}$ alkyl, aralkyl or aryl group which may have at least one oxygen, nitrogen or sulfur atom; X represents a leaving group selected from the group consisting of halogen, isocyanate, tosyl and azide; Y represents a reactive functional group of coordinate compounds capable of exchanging ligands selected from the group consisting of hydroxyl, thiol, amine, ammonium, sulfone and its salt, carboxyl acid and its salt, acid anhydride, epoxy, aldehyde, ester, acrylate, isocyanate (—NCO), sugar residue, double bond, triple bond, diene, diyne and alkylphosphine in which said reactive functional group may be present in the middle or at the terminal ends of said linking compound.

4. The process according to claim 2, wherein said process further comprises the step of drying said chitosan-linking compound-zeolite hybrid to generate a sponge form after the preparation of said double-crosslinked chitosan-linking compound-zeolite hybrid.

5. The process according to claim 4, wherein said process further comprises the step of intruding water into said sponge form after the drying.

6. The process according to claim 4, wherein said transforming to a sponge form is carried out by freeze-drying.

7. The process according to claim 4, wherein said chitosan or chitosan-linking compound is provided in an aqueous solution and a size of pores of said porous chitosan-linking compound-zeolite hybrid is adjusted depending on a weight ratio of water in the aqueous solution to said chitosan or chitosan-linking compound.

8. The process according to claim 1, wherein said process further comprises the step of preparing a sponge form of said chitosan-linking compound-zeolite hybrid by drying said chitosan-linking compound-zeolite hybrid after the final step.

9. The process according to claim 8, wherein said process further comprises the step of intruding water into said sponge form after the drying.

10. The process according to claim 8, wherein said transforming to a sponge form is carried out by freeze-drying.

11. The process according to claim 1, wherein said chitosan or chitosan-linking compound has a variety of forms.

12. The process according to claim 1, wherein a size of pores of said porous chitosan-linking compound-zeolite hybrid is adjusted depending on a concentration ratio of said zeolite to said chitosan or chitosan-linking compound.

13. A process for preparing a porous chitosan-linking compound-zeolite hybrid, comprising the steps of:
    (a) forming a linking compound-zeolite intermediate by linking a linking compound to the surface of zeolite, in which the surface of said linking compound-zeolite intermediate displays functional groups unreactive with functional groups of chitosan or a linking compound-chitosan; and
    (b) preparing said chitosan-linking compound-zeolite hybrid by homogeneously mixing said linking compound-zeolite intermediate with chitosan or said linking compound-chitosan and reacting the resulting mixture with a bifunctional compound to be reactive with said linking compound-zeolite intermediate and chitosan or said linking compound-chitosan.

14. A process for preparing a porous chitosan-linking compound-zeolite hybrid, comprising the steps of:
    (a) transforming a chitosan solution or a linking compound-chitosan solution to a sponge form;
    (b) forming a linking compound-zeolite intermediate by linking a linking compound to the surface of zeolite; and
    (c) preparing said chitosan-linking compound-zeolite hybrid by forming covalent bonds between function groups of said linking compound-zeolite intermediate and function groups on the surface of said chitosan sponge or said linking compound-chitosan sponge.

15. A process for preparing a porous chitosan-linking compound-zeolite hybrid, comprising the steps of:
    (a) forming a linking compound-zeolite intermediate by linking a linking compound to the surface of zeolite;
    (b) mixing said linking compound-zeolite intermediate with chitosan or said a linking compound-chitosan;
    (c) transforming the mixture of step (b) to a sponge form; and
    (d) preparing said chitosan-linking compound-zeolite hybrid by forming covalent bonds between function groups of said linking compound-zeolite intermediate and function groups of said chitosan or said linking compound-chitosan contained in said sponge form.

16. The process according to claim 15, wherein said forming covalent bonds between functional groups is carried out by heating treatment.

17. The process according to claim 15, wherein said process further comprises the step of drying said chitosan-linking compound-zeolite hybrid after the final step.

18. The process according to claim 17, wherein said process further comprises the step of intruding water into said sponge form after the drying.

19. The process according to claim 15, wherein said transforming to a sponge form is carried out by freeze-drying.

20. The process according to any one of claims 1-14, wherein said linking compound used for preparing said linking compound-zeolite intermediate and said linking compound-chitosan is selected from the group consisting of the compounds represented by the following formulae:

$$R_3Si-L-X \quad \text{Formula 1}$$

$$R_3Si-L-Y \quad \text{Formula 2}$$

$$Y-L-Y \quad \text{Formula 3}$$

$$Y-Y, \text{ and} \quad \text{Formula 4}$$

$$R_3Si-L \quad \text{Formula 5}$$

wherein R represents a halogen atom, $C_1$-$C_4$ alkoxy or alkyl group in which at least one of three R groups is a halogen atom or alkoxy group; L represents a substituted or unsubstituted $C_1$-$C_{17}$ alkyl, aralkyl or aryl group which may have at least one oxygen, nitrogen or sulfur atom; X represents a leaving group selected from the group consisting of halogen, isocyanate, tosyl and azide; Y represents a reactive functional group of coordinate compounds capable of exchanging ligands selected from the group consisting of hydroxyl, thiol, amine, ammonium, sulfone and its salt, carboxyl acid and its salt, acid anhydride, epoxy, aldehyde, ester, acrylate, isocyanate (—NCO), sugar residue, double bond, triple bond, diene, diyne and alkylphosphine in which said reactive functional group may be present in the middle or at the terminal ends of said linking compound.

21. A porous chitosan-linking compound-zeolite hybrid, characterized in that it is prepared in accordance with the process of any one of claims 1-14.

22. An adsorbent characterized in that it comprises the porous chitosan-linking compound-zeolite hybrid of claim 21 and is capable of removing both cationic substances including heavy metals and anionic substances present in polluted water or wastewater.

23. A method for purifying water comprising contacting polluted water or wastewater to the porous chitosan-linking compound-zeolite hybrid of claim 22.

* * * * *

UNITED STATES PATENT AND TRADEMARK OFFICE
CERTIFICATE OF CORRECTION

PATENT NO. : 7,601,211 B2  Page 1 of 1
APPLICATION NO. : 10/560964
DATED : October 13, 2009
INVENTOR(S) : Kyung Byung Yoon et al.

It is certified that error appears in the above-identified patent and that said Letters Patent is hereby corrected as shown below:

Column 16, Claim 20, Line 66
Please delete "claims 1 – 14"
and replace with -- claims 1, 13, 14 and 15 --

Column 18, Claim 21, Line 11
Please delete "claims 1 – 14"
and replace with -- claims 1, 13, 14 and 15 --

Signed and Sealed this

Fifteenth Day of December, 2009

David J. Kappos
*Director of the United States Patent and Trademark Office*